March 15, 1966   V. MILENKOVIC   3,241,020
SINGLE CHANNEL PROGRAMMED TAPE MOTOR CONTROL FOR MACHINE TOOLS
Filed July 31, 1961   7 Sheets-Sheet 1

INVENTOR.
VELJKO MILENKOVIC
BY
ATTORNEY

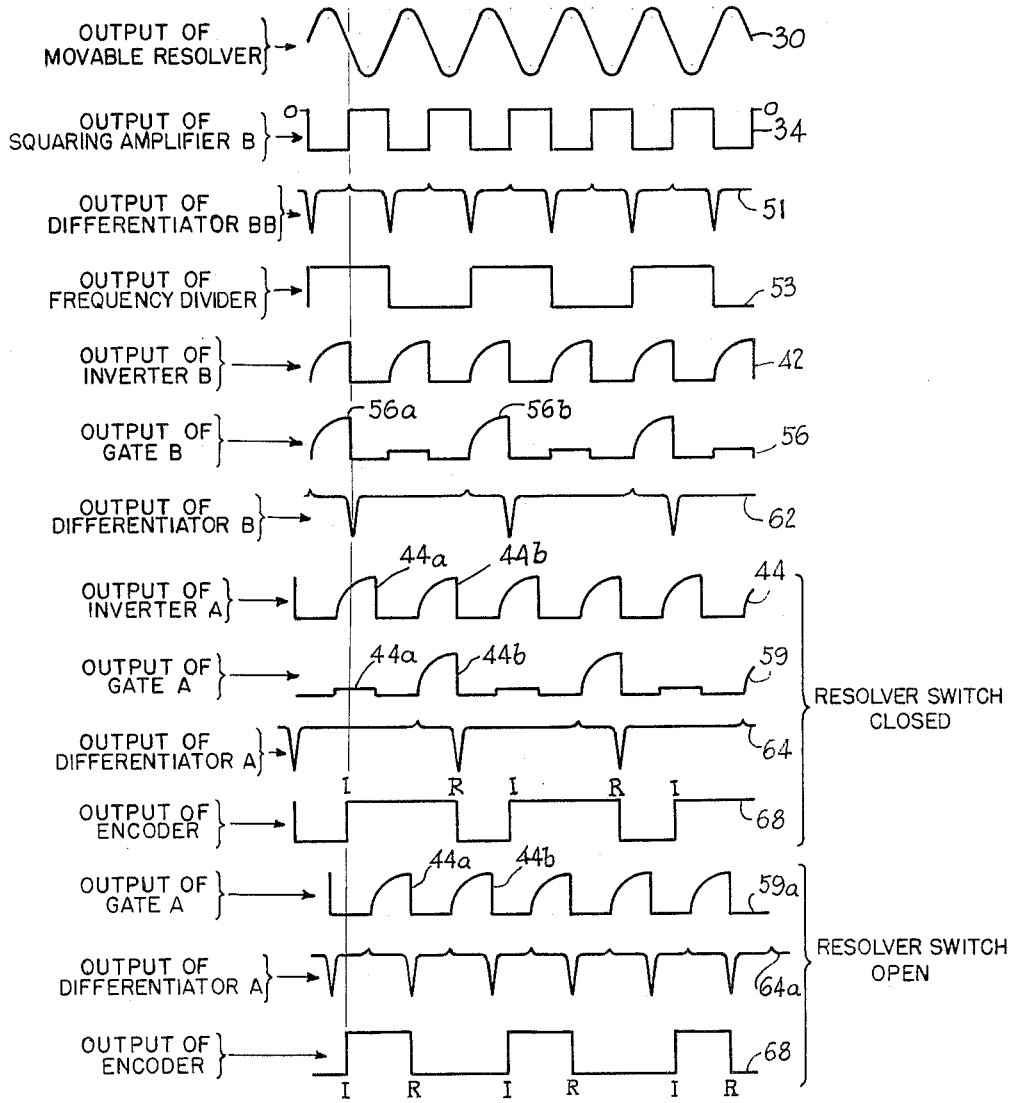
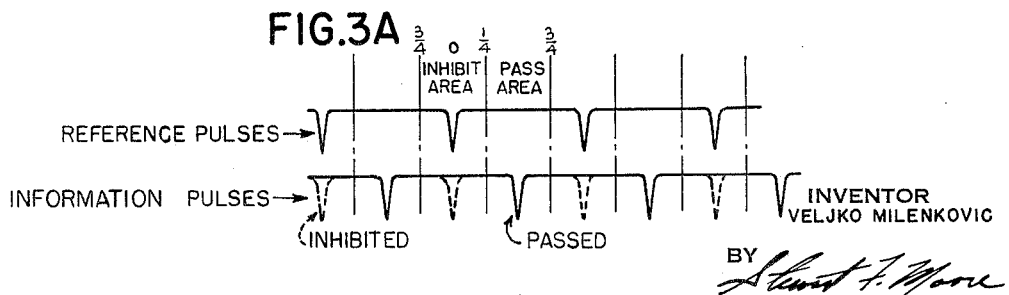

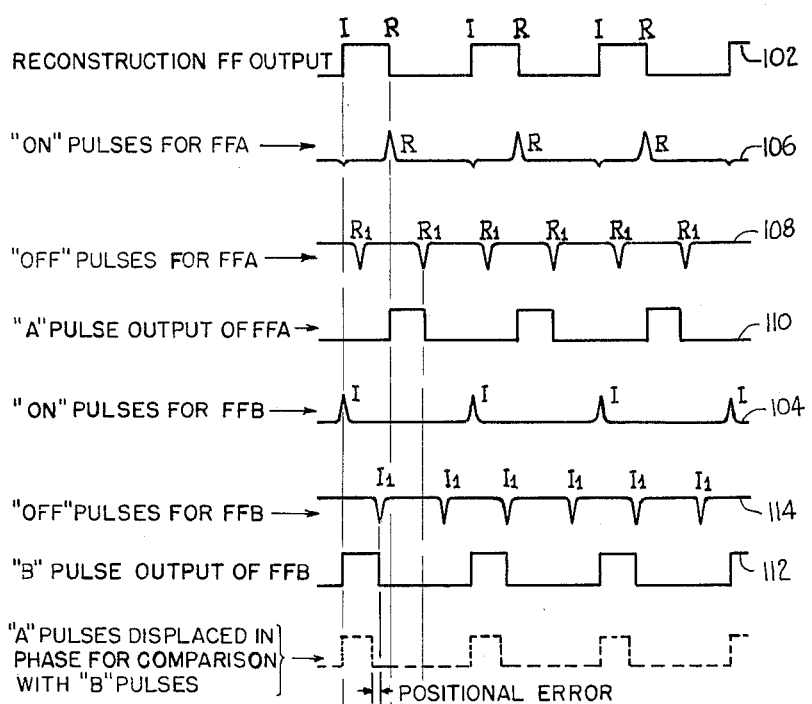
FIG.5
FIG.5A
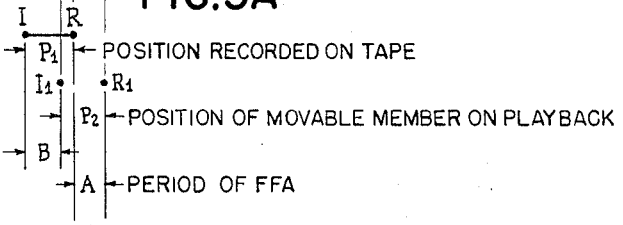
FIG.4
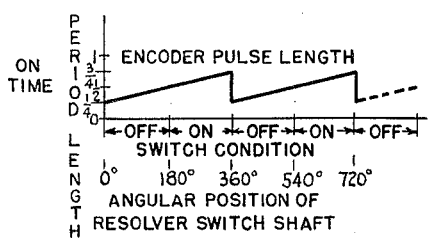
INVENTOR
VELJKO MILENKOVIC
BY
ATTORNEY

*INVENTOR.*
VELJKO MILENKOVIC
BY
ATTORNEY.

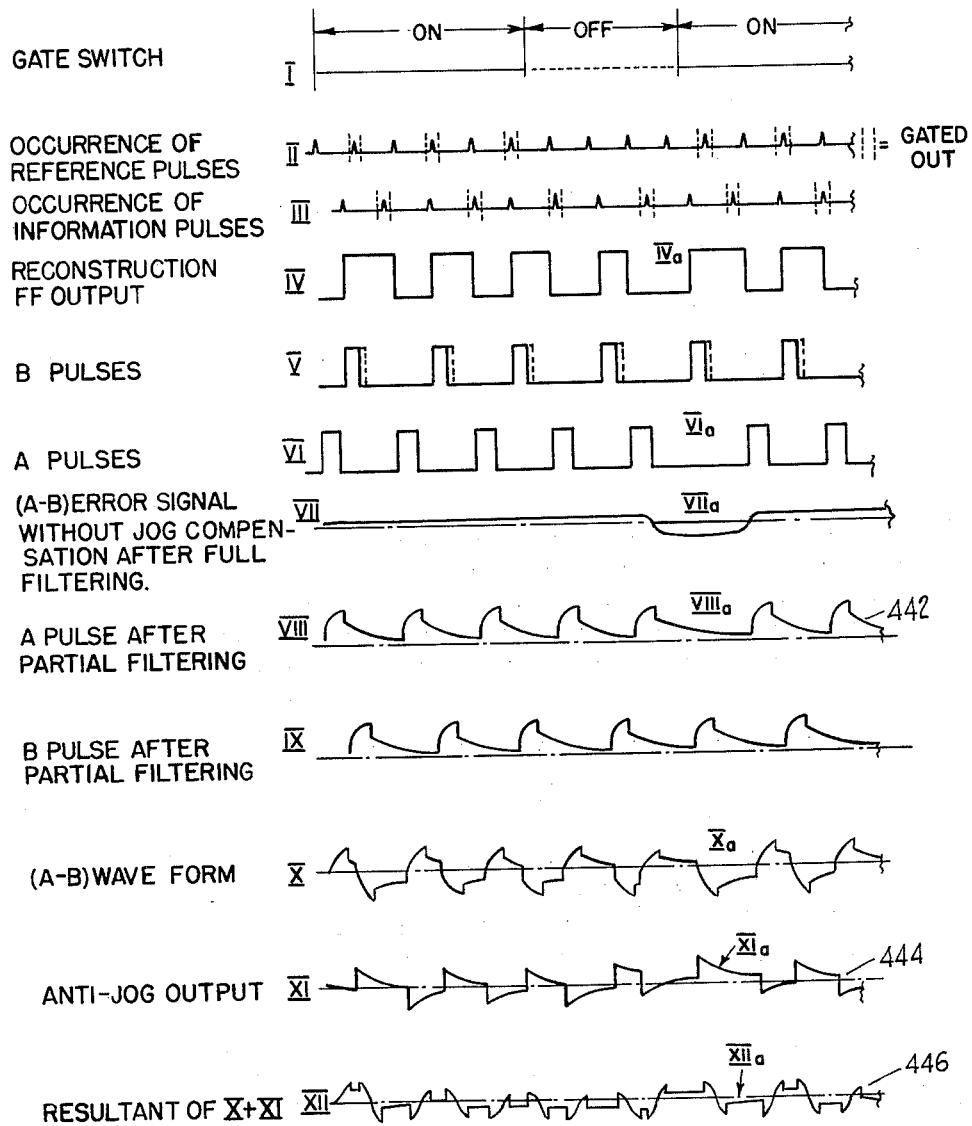

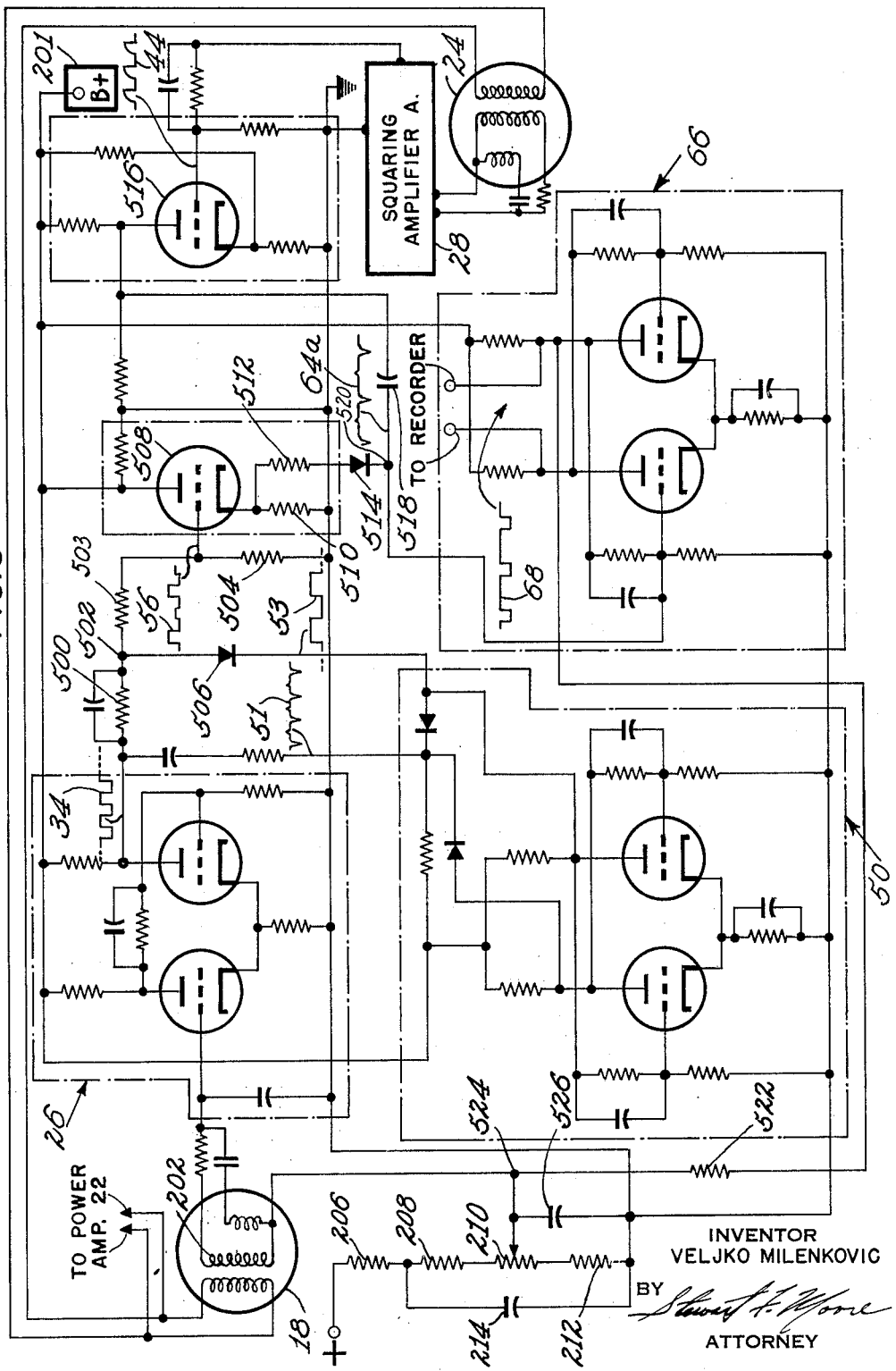

United States Patent Office 3,241,020
Patented Mar. 15, 1966

3,241,020
SINGLE CHANNEL PROGRAMMED TAPE MOTOR
CONTROL FOR MACHINE TOOLS
Veljko Milenkovic, Park Ridge, Ill., assignor to American
Machine & Foundry Company, a corporation of New
Jersey
Filed July 31, 1961, Ser. No. 127,971
19 Claims. (Cl. 318—162)

This invention relates to automatic position control apparatus, and more particularly to a system for automatically programming and controlling the position of a movable member such as a machine member or the like.

Currently, systems providing programmed position control of movable members generally use analog or digital techniques as the basis for translating position coordinates of the movable member into information capable of being stored. Digital systems require large amounts of complex equipment to insure playback accuracy. In addition they require relatively long periods of time to set up a program of motions for the movable members to follow and repeat. Such systems are not readily adaptable to applications where both versatility of the controlled member and ability to easily and quickly change a program are required.

Conventional analog systems may utilize amplitude, frequency or phase displacement as quantity analog to the position of a moving member. Yet, such analog systems generally possess low accuracy because of the finite resolution of electrical apparatus.

If magnetic tape is used as the recording medium, the phase displacement system of position control appears most advantageous because of the limitations imposed by the medium. It is relatively easy to record both reference and position phases on a single channel if the phase excursion is limited to less than 360 electrical degrees. However, this limitation reduces the positioning accuracy if the required stroke of the movable member is large. Therefore, in such systems, two generally separate channels of the tape are utilized to control one degree of member motion. The problems associated with synchronizing such channels and compensating for tape skew between channels when discrete sine waves are recorded, places serious limitations on the accuracy of such systems.

It is therefore an object of the present invention to provide a single channel system for automatically programming and controlling the position of movable members.

It is a further object of the invention to provide an automatic, movable member, position controlling system having means for translating the position coordinates of a movable member into position pulses which are position modulated with respect to reference pulses in accordance with changes in the physical position of the controlled member.

It is yet another object of the present invention to provide a system for automatically programming and controlling the position of movable members in which the program for the member to repetitively follow at a subsequent time is set up, recorded, and stored simultaneously by manually guiding the movable member through a desired path of travel.

In general, in accordance with the invention, means are provided for detecting the instantaneous position of the movable member as it is being moved by some external, manually controlled means. Means are further provided for translating information representative of such position into position pulses suitable for storage in a memory device such as on a single channel of a magnetic tape. The present invention further contemplates means for reading out and decoding the information from such a memory storage device and means for utilizing the decoded information to generate the necessary control signals for actuating appropriate devices such as hydraulic, electrical or mechanical actuators to cause the movable member to automatically repeat the original, manually controlled motion.

The control system according to the present invention furthermore permits recording signals representative of the instant position of the movable member at one frequency rate and playing back such signals at another frequency rate. The basic position intelligence of the movable member is translated by the control system into two sets of repetitive signals.

One set, which will be called hereafter the reference pulses, occurs at regular time intervals. For example, a typical pulse interval used in practicing the invention is two milliseconds. The other set which will be known hereinafter as information pulses, and which represent the position of the movable member, occurs at substantially the same rate but their timing is offset a variable amount with respect to the reference pulses. The ratio of the offset to the total period as established by any two successive reference pulses, that is, the time lag from any reference pulse to the next succeeding information pulse divided by the time interval between two consecutive reference pulses, is in linear correspondence with the physical position coordinate of the movable member.

For example, a ratio of 0.5 in the case of the example referred to above, would be a lag of one millisecond, and may arbitrarily represent 1½ inches of member position, measured from a predetermined reference point. The advantage of linking the position intelligence to the timing ratio rather than to absolute time lies in the invariability of this ratio when the playback rate is altered or when it fluctuates due to imperfections of a magnetic tape recorder drive system.

During a typical motion program the offset ratio may gradually increase until it approaches unity. At this moment the information pulses would be coincident with the reference pulses and therefore the offset ratio may be considered to be zero. Continuation of the motion would make the ratio grow from zero onward, reach unity and start from zero again. That is, therefore, a consequent ambiguity in the position intelligence with such a system in that, for each pulse configuration, there are several corresponding members positions equally spaced at some distance, e.g., three inches in the cited illustration. The correct position during the programming and playback, however, is insured by virtue of a continuous, unbroken flow of pulse information as well as physical continuity of member motion, provided that the member is correctly located at the beginning of a given operation.

To insure the necessary positional accuracy during a programming operation, it is necessary to maintain accurate timing between reference and information pulses during playback. This is achieved by recording both sets of pulses on the same tape channel and distinguishing one set from the other by polarity. However, such a method does not permit coincidence or near coincidence of two pulses, since at the point of coincidence the pulses would cancel each other out.

Coincidence cancellation is eliminated in accordance with an important feature of the present invention by first inhibiting every other pulse for a selected one of the pulse trains before recording the encoded information tape. Thus, referring again to the previous example, if every other reference pulse is removed, the reference interval between pulses becomes four milliseconds, leaving two information pulses occurring within each interval and following each other every two milliseconds. Next, means are provided such that, the first of such pulses is inhibited if it occurs less than one millisecond after the start of the reference interval, and the second pulse is utilized. On the other hand, if the first information pulse arrives later than one millisecond after the start of the reference interval then it is utilized to convey position information and the second pulse is inhibited. Thus, a minimum spacing of approximately one millisecond between any two pulses on the tape is assured. In terms of the new interval for the example given above, the pulse offset ratio can therefore vary from .25 to .75, depending upon the position of the movable member, but never any greater or less than this range. Thus, zero ambiguity can never occur.

For a better understanding of the invention, together with other and further objects thereof, reference is made to the following detailed description taken in connection with the accompanying drawings, in which:

FIG. 3 is a wave form diagram of certain signals generated during operation of the position control programming system.

FIG. 3a is a wave form diagram of assistance in the exposition of the invention.

FIG. 4 is a curve showing the relationship between encoder pulse output length, and the position of the movable member resolver switch.

FIG. 5 is a wave form diagram of certain signals generated during operation of the system for reproducing a position control program.

FIG. 5a is another diagram of assistance in the exposition of the invention.

FIG. 7 is a wave form diagram of certain signals generated during the operation of the position control, program reproducing system of the present invention.

FIG. 8 is a schematic circuit diagram of a modification of a portion of the system shown in FIG. 1.

Figure 1:
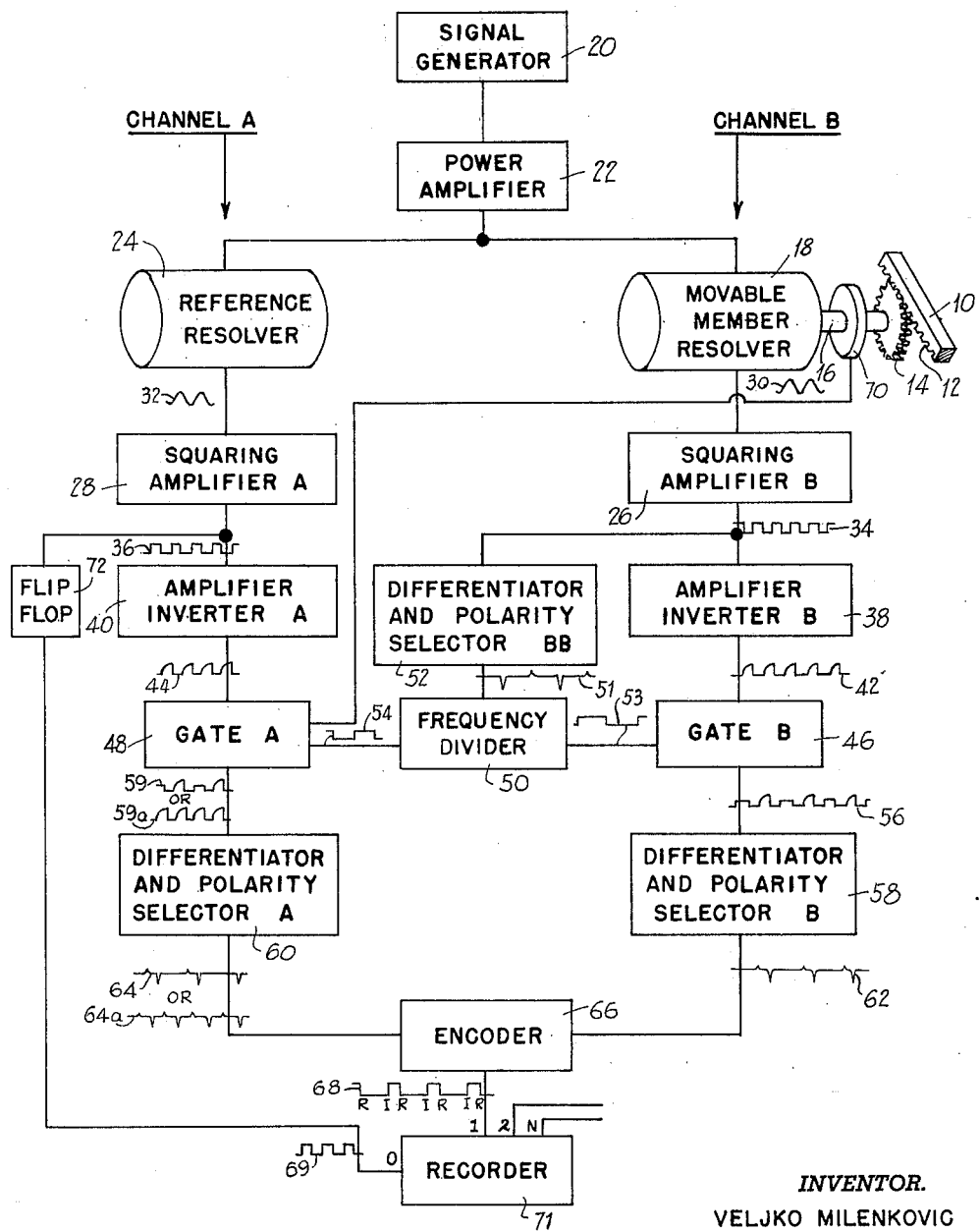
FIG. 1 is a schematic block diagram of the position control programming system of the present invention.

Referring now to FIG. 1, there is shown in block schematic form, an electrical system for generating information concerning the instant position of a movable member 10 relative to a selected position thereof. In order to simplify the description, member 10 is symbolically illustrated as a fragmentary structure having gear teeth 12 thereon for transmitting a change position to a corresponding gear 14 which is affixed to a shaft 16. It will be understood, however, that member 10 may be any movable structure capable of being moved along a desired path of travel, and about which it is desired to record and store information concerning the history of travel of such a member. For example, member 10 may be an automated machine tool or the movable operating portions of an article transferring apparatus of the type described in my co-pending application, Serial Number 43,090.

Affixed to shaft 16 is a suitable phase shifting device 18 effective to provide an output signal displaced in phase with reference to an input signal by an amount corresponding to the angle of rotation of the shaft 16. Such a device may be an induction resolver, which is essentially a transformer having a rotary variable coupling between primary and secondary windings, the windings being distributed in the various stator and rotor slots in such a manner as to obtain a sinusoidal phase shift relationship between input and output voltage which is a function of angle to rotation of the rotor.

A signal generator 20 which may be a conventional oscillator, provides a source of A.C. voltage for operating resolver 18. Signal generator 20 has its output connected to a power amplifier 22 which in turn is connected to the input of the resolver 18, and a second adjustable resolver 24 which serves as a reference resolver for the system. Resolver 24 is initially adjusted to a selected phase displacement position. Resolver 24 is provided, in order that unwanted phase shifts in the signal output of generator 20 do not occur due to changes in the parameters of resolver 18, as, for example, changes in inductance due to ambient temperature changes. Thus, any external factors causing unwanted variations in resolver 18 will be balanced out by causing similar but opposite variations in resolver 24.

As phase shifters of the resolver type function best when the input voltage thereto is of a sine wave character, the output signal of generator 20 is preferably in the form of a sine wave. Thus, the output signal of movable member resolver 18 is a sine wave 30 displaced in phase in reference to the input thereof by an amount corresponding to the changed position of movable member 10, whereas the output of "fixed" or "common" resolver 24 is a sine wave whose phase, with respect to the input sine wave thereto, is maintained as constant as possible.

The output frequency of signal generator 20 is preferably in the audio frequency spectrum. By way of explanation of the invention, and for purposes of simplifying this description, a frequency of 500 cycles has been selected as the standard reference frequency. Such a frequency provides an alternation of one-half cycle once every millisecond.

For a better understanding of the invention, the portions of the system and component units thereof relating to the generation and utilization of reference signals, may be considered as forming a channel A, whereas that portion of the system relating to the generation and handling of information signals representative of the instant position of the movable member, may be considered as forming a channel B.

The signal outputs of resolvers 18 and 24 are each respectively fed to squaring amplifiers 26, 28 of channels A and B respectively, which may be conventional Schmitt trigger circuits. It is well known that such circuits will translate a sine wave input into a square wave output, as indicated by wave forms 30, 32 which are translated into square waves 34, 36 respectively by squaring amplifiers 26 and 28 (FIGS. 1 and 3). The square wave signal outputs of squaring amplifiers 26, 28 are then fed to corresponding amplifier inverters 38, 40, whose inverted output waves 42, 44 respectively are fed to a pair of corresponding gating circuits 46 and 48, respectively. Gating circuits 46, 48 may be conventional AND gates which receive their second and operating input from a frequency divider unit 50 which is preferably of the scaler type.

The function of the scaler frequency divider 50 is to eliminate every other pulse from the chain of pulses 42, 44 being fed to gate 46 and 48 so that the outputs thereof have their pulse frequency reduced by one-half. The frequency dividing function is accomplished by feeding pulses 34 from squaring amplifier 26 through a differentiator and polarity selector 52 which differentiates and transmits only the negative going wave front portions of pulses 34 to the input of frequency divider 50 forming a train of pulse spikes 51. Thus, it will be seen that if the original pulse frequency is approximately 500 cycles, then the differentiated negative going pulses 51 would have a repetitive rate of 500 cycles and would therefore be spaced substantially 2 milliseconds apart.

Frequency divider 50 is preferably a binary type scaler circuit which has either an "on" or "off" state, capable of changing from a first state to the opposite state thereof each time an input pulse is received. In this manner the output signal of frequency divider 50 is a square wave whose frequency is one-half that of the original squaring amplifier output frequency, or 250 cycles, as it is triggered "on" by a first one of pulses 51 and "off" by a second one of pulses 51.

Frequency divider 50 has two square wave output signals 53 and 54, each of which is the inverse of the other, and which are respectively transmitted to gates 46, 48. These two output signals of frequency divider 50 are adapted to turn gates 46, 48 on or off, depending upon the polarity of the pulses fed thereto.

As the frequency output of frequency divider 50 is one-half the frequency of the input signals 42, 44 applied to gates 46 48, then every other pulse from amplifier inverter 38, 40, fed to the first inputs of gates 46, 48, will be inhibited. This is shown in FIG. 3 for the case of channel B. The situation for channel A is slightly modified as will be described hereinafter. The resulting pulse outputs from gates 46, 48 are indicated by reference numerals 56, 59.

The output signals from each gate 46, 48 are passed through differentiator and polarity selectors 58 and 60 respectively. Here the negative going portions of the pulse wave form signals are again differentiated with the positive going portions being inhibited so that only negative pulse spikes having a spacing of four time units or four milliseconds remain, as shown in FIG. 3 for channel B pulses. The output wave forms from differentiator and polarity selectors 58, 60, indicated as 62, 64, are fed to the dual input of an encoder unit 66.

This unit may be a conventional flip-flop circuit having a pair of inputs which are so connected to differentiator and polarity selectors 58 and 60 that the pulse spikes of signal 62 from unit 58 turn the encoder "on," whereas the pulse spikes of signal 64, from unit 60, turn the encoder "off" by flipping it in the opposite direction. The output signal 68 of encoder 66 is then a square wave which is turned "on" by the information pulses from channel B indicating the relative position of the movable member 10 and turned "off" by reference pulses from channel A.

It will become readily apparent that during the course of travel of movable member 10, positions will be reached which, when expressed in terms of the position of encoder actuating pulse signals 62 and 64, will result in coincidence of these two pulses of opposite polarity, thus causing cancellation of each other, and zero output of flip-flop 66. As will be described in detail below, this null or coincidence ambiguity may be eliminated by establishing arbitrary limits around each pulse of a first selected pulse train signal such as either signal 62 or 64, which set up a timing area into which no pulse from the second signal of the opposite channel can lie. For example, within the certain designated areas, the information pulses may be inhibited so that the coincidence problem can never occur.

This is illustrated in FIG. 3a, wherein the spacing between succeeding reference pulses is arbitrarily divided into four equal time intervals of one millisecond each, and one of each such intervals on either side of a reference pulse is designated as an inhibit area. It will be seen that, by means of the system about to be described, any information pulses 62 occurring in channel B which have a time relationship with respect to the reference pulses such that they occur within the inhibit area, will not be passed to encoder 66. If the arbitrary inhibit area comprises one-half of the total time interval between successive reference pulses, or 2 milliseconds, then the resultant output of encoder 66 is a train of square waves 68, whose length is no less than one-quarter of a period and no greater than three-quarters of a period between successive reference pulses.

In accordance with one embodiment of the invention, the inhibit and pass areas are defined by operation of a switch 70, driven by shaft 16, and having a pair of contacts connected to gate 48 of channel A. Switch 70 may be a conventional cam operated switch which opens and closes a pair of contacts once every 180 degrees of shaft rotation. Therefore, for every revolution of shaft 16, switch 70 has an equally divided "on" or "off" period. The switch contacts of switch 70 are connected to gate 48 in such a manner that the gate is rendered inoperative when the contacts are open and operative when closed. The circuit details of this arrangement will be described hereinafter.

The inhibition area may be set up about either the reference pulses or the information pulses since both pulse trains are identical in frequency and magnitude but differ only in their phase displacement with respect to each other. Thus, switch 70 may be connected to either gate 46 or 48 to effect the desired result. For purposes of simplifying the description, and in accordance with a practical embodiment of the invention, it is shown in FIG. 1 and described hereafter, as controlling gate 48 of reference channel A.

When gate 48 of channel A is rendered inoperative by operation of switch 70, which in turn, depends upon the position of shaft 16 and movable member 10, then the pulses 54 from the output of frequency divider 50 are also prevented from operating this gate. When the gate is in this condition, the output of frequency divider 50 has no effect thereon, and all input pulses 44 from amplifier-inverter 40 are passed therethrough and presented as pulses having wave form 59a to the input of differentiator and polarity selectors 60. Thus, by operation of frequency divider 50, gate 46 will consistently cancel every other pulse from pulse train 42 so that its output wave form is always as shown by pulse train 56 whereas gate 48 will or will not cancel every other pulse 44 received thereby, according to whether machine switch 70 is on or off. The output wave form from gate 48 will then take the form of pulse train 59 or 59a, depending upon the condition of switch 70.

Whether the discrete pulses of each signal passing through each channel, such as the pulse of signals 34, 36, are more or less than a quarter of a period apart is, then, a function of the position of movable member 10, since the relative position of the sets of pulses is derived from a phase displacement provided by resolver 18. This is a fact which can be readily detected by cam operated switch 70. Thus, if movable member 10 is in such a position that the switch is closed, the relationship between the reference and information pulses is such that the lag or phase displacement therebetween is less than one quarter of a period. Conversely, if the switch contacts are open, then the lag is greater than one quarter of a period and the gating unit 48 is inoperative. Consequently, there is no rejection of any of the raw reference pulses 36 or 44. In this situation the pulse output of gate 48 would be as shown in FIG. 1 and indicated by reference number 59a.

In this instance, all of the pulses from channel A forming waveform 59a are fed to encoder 66. Inasmuch as the first occurring information pulse 62 turns on encoder 66, then the next reference pulse to be received by encoder 66 will turn it off. Thus, even though a second reference pulse occurs within a half period after the first reference pulse, it will have no effect upon encoder 66 as it has already been turned off by the previously received reference pulse. Accordingly, when switch 70 is open, indicating that certain of the reference pulses 64 are occurring later than one-quarter of a period after information pulses 62 and less than three-quarters of a period after pulse 62, all of these pulses which are occurring at twice the frequency rate of pulses 62, are fed to encoder 66.

The two states of resolver switch 70, "closed" and "open," and their effect upon the pulse train output of channel A, is graphically illustrated in FIG. 3. Assume that the information pulses 56 from gate 46 have a time distribution as shown in FIG. 3, curve 6. Then if resolver switch 70 is "closed," every other pulse of reference pulse train signal 44, such as pulse 44a, has a time spacing less than a quarter of a period from at least one pulse in pulse train 56, such as 56a. Since switch 70 is closed, gate 48 of channel A is operative. Pulse 44a falls within the inhibiting period of the gate, resulting in no output during the time period represented by pulse 44a. On the other hand, the next succeeding pulse 44b is passed by gate 48 as it is outside the inhibit area, and results in a wave form 59 as shown in FIG. 3. It will be seen that pulse 44b is greater than a quarter of a period away from the trailing edge of pulse 56b. Encoder 66 will accordingly be turned "on" by the pulses of signal 62, derived by differentiating the trailing edges of pulses 56a, 56b, etc., and turned "off" by pulses 64 derived by differentiating the trailing edge of pulse 44b and following pulses of signal 59.

In the case where resolver switch 70 is "open" (FIG. 3), then pulses 44a, 44b are passed freely by gate 48, inasmuch as the trailing edges of all of pulses 44a, 44b are greater than a quarter of a period away from the trailing edges of pulses 56a, 56b. Thus, the pulse train output 59a from gate 48 is differentiated by differentiator 60 and applied to encoder 66 as pulse train 64a. The resulting pulse output of encoder 66 is as shown in FIG. 3. It will be noted that since the first pulse received from differentiator 60 of channel A will turn "off" encoder 66, then the next succeeding differentiated pulse from differentiator and polarity selector 60 will have no effect upon encoder 66 as it is already "off." This latter pulse is effectively discarded.

The relationship between the angular position of shaft 16 of resolver 18, the "on" and "off" periods of switch 70, and the length of the "on" period of the output pulses of encoder 66, expressed as a fractional length of the total "on" period available, is shown in FIG. 4. It will be seen that the pulse "on" period varies with position of shaft 16 between a minimum of one-quarter of a period and a maximum of three-quarters of a period. As soon as either limit is reached, the pulse length jumps quickly from maximum to minimum or vice versa, depending upon the direction of rotation of shaft 16.

The output of encoder 66 may be fed to a suitable pulse storage device such as a magnetic tape recorder 71 provided it is capable of recording a rectangular wave having "on" and "off," or binary characteristics. In the case of magnet tape recording the polarity of the flux of the magnetic recording medium, of course, is merely changed from one direction to another. If desired, conventional frequency shift techniques may be used to provide a signal more suitable for recording than feeding the encoder output directly to a magnetic tape recorder. That is, the encoder signal may be used to frequency modulate an audio oscillator, so that the "on" portions of signal 68 are characterized by a first audio frequency, whereas the "off" portions are characterized by a second audio frequency. Such signals are more adaptable for recording by media other than magnetic tape. For example, disc or film recording may be used. Conventional demodulators may be provided to convert the tone signals back into "on," "off" signals during the playback operation.

A major advantage of the present invention for recording change of position is the fact that all of the information necessary for recording and reproducing smoothly a change in position of a movable member can be handled by a single recording channel. The necessity for a second, or reference frequency channel is eliminated since it will be appreciated that both the reference and change of position information is represented by the ratio between the "on" and "off" time of the recorded pulses. Thus, by generating and recording in the manner just described, a continuous train of such pulses, a complex program of movement for member 10 may be stored for future use.

When the present invention is used to indicate change of position of a movable member which is operating in conjunction with several other movable members, or when a single member is being moved simultaneously through several degrees of freedom, pulse information concerning each of these movements may be stored in associated channels. Therefore, several channels of information may be recorded simultaneously on a single magnetic media, such as a wide band magnetic tape used in conjunction with a multiple head tape recorder. For example, the system comprising the present invention may be used in conjunction with a plurality of such systems to sense and control the position of a movable member having several degrees of freedom such as the movable arm of a gripping and transfer device of the type described in copending application, S.N. 43,090. Thus, recorder 71 is shown in FIG. 1 as having several channels for recording control signals for other movable members or for several degrees of freedom of motion for a single member.

In addition, it is advantageous to provide a utility signal channel which receives a reference frequency signal. Such a signal is useful on playback to provide a source of synchronizing pulses at reference frequency, or may control other functions of associated devices. Accordingly, as shown in FIG. 1, square wave signals 69 of reference frequency are generated by a flip-flop circuit 72 connected to the output of squaring amplifier 28 of channel A, and are fed to channel 0 of recorder 71.

The program playback system for controlling the position of movable member 10 will now be generally described. In its broadest aspects, the playback system provides a pulse signal derived from the recorded encoder signal, and representing the desired positions of the movable member at a given instant. Means associated with the system provide a second pulse signal, representative of the actual position of the movable member at the given instant. The two signals are compared, an error voltage representing the difference between these signals is obtained, and the error signal is fed to a servo mechanism which drives the movable member in the proper direction to null the error signal.

Figure 2:
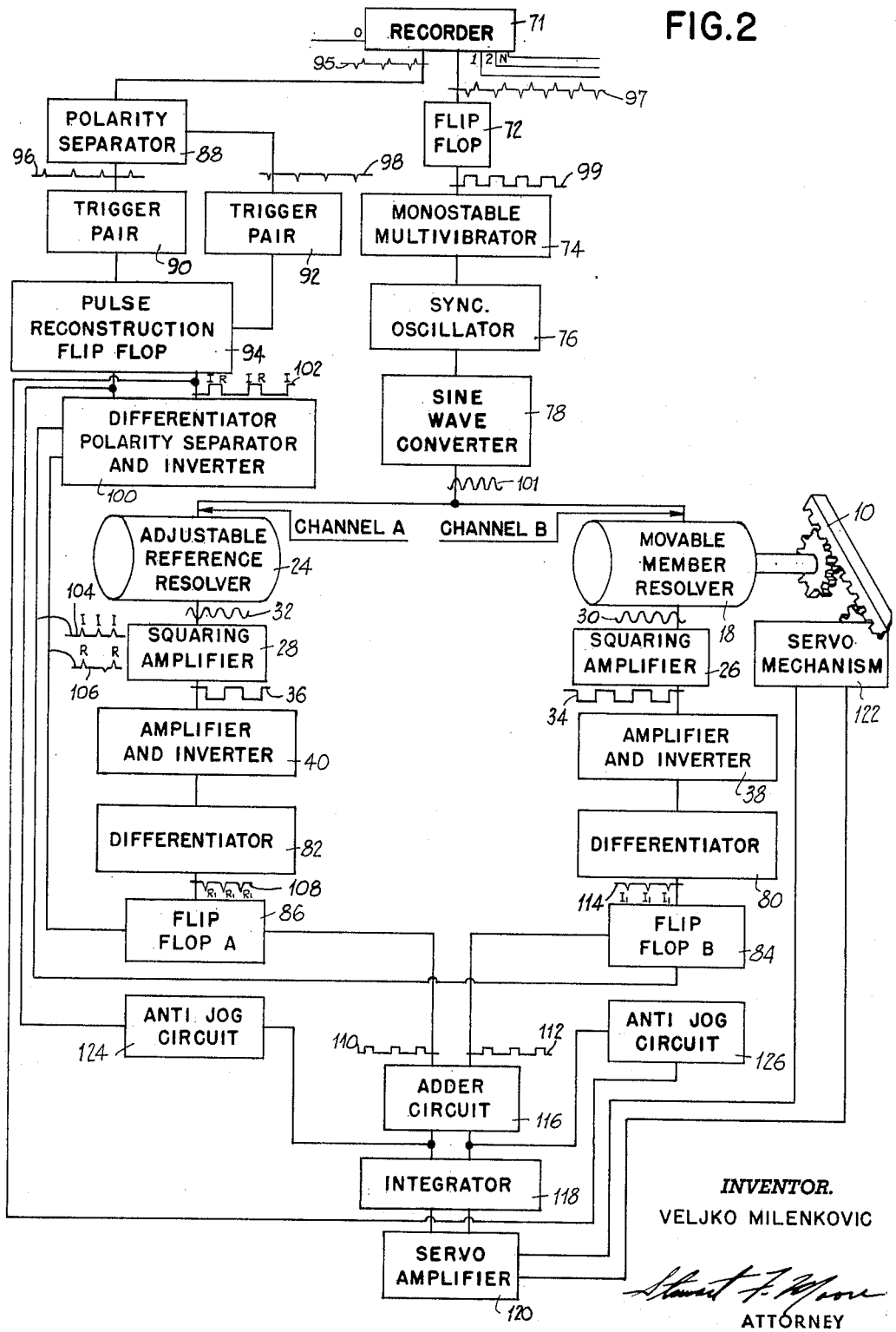
FIG. 2 is a schematic block diagram of the position control, program reproducing system.

With reference to FIG. 2, the output signal from reference frequency channel (0) of recorder 71, comprising square waves occurring at the reference frequency, is fed to a flip-flop circuit 72 which, in turn, is connected to monostable multivibrator 74. As only the rate of change of flux in the magnetic tape is detected by conventional recording heads, then only differentiated square waves, that is, positive and negative spikes, are detected by the recording pickup heads during playback. Thus, the output signal from the recorder playback channels must be retranslated into square waves to perform useful functions.

Accordingly, the positive and negative spikes 97 occurring at the reference frequency, trigger flip-flop circuit 72 so as to provide an output signal therefrom having a square wave characteristic. The output signal 99 of flip-flop circuit 72 is fed to a monostable multivibrator 74 where the signals are additionally shaped and squared. Monostable multivibrator 74 also serves to remove from output signal 99, unwanted signal components, not of reference frequency, allowing only synchronizing pulses for the reference frequency to be retained. The output of multivibrator 74 is connected to a sync oscillator 76, with the pulses from multivibrator 74 serving to trigger and "lock in" sync oscillator 76 to the reference frequency.

Sync oscillator 76 will continue to produce output pulses even if synchronizing pulses are lost because of "tape drop-out," which is an unwanted characteristic of magnetic tape recording. Sync oscillator 76 is preferably adjusted as close to the reference frequency as possible. The pulse output from the sync oscillator is fed to a sine wave converter 78 which may be a conventional class C amplifier, the characteristics of which serve to round the square pulse output of sync oscillator 76 into corresponding sine waves.

The output of converter 78 is connected to movable member resolver 18 and adjustable reference resolver 24 so that sine wave signals 101 may be fed thereto as an operating signal at reference frequency. These resolvers are preferably the same units used during the program recording operation. As will be pointed out in more detail hereinafter, resolvers 18, 24 may be switched between the record and playback units so as to function during both operations. Since a number of the circuit elements, in addition to the resolvers, perform the same functions during record and playback, like reference numerals are use in this description to indicate any such units.

Thus, the outputs of resolvers 18 and 24 are connected to squaring amplifiers 26, 28 which may be Schmitt trigger circuits as in the recording system. The output signals from squaring amplifiers 26, 28, now in the form of square waves, are fed through amplifier-inverters 38, 40, to differentiators and polarity separators 80 and 82, respectively. The outputs of differentiators 80 and 82 are connected to a pair of flip-flop circuits 84 and 86, respectively designated as flip-flops B and A. The polarity of the output waveform spikes 114, 108 from differentiator and polarity separators 80, 82 is selected so that the outputs from these units will turn off their respectively associated flip-flop circuits 84, 86 as will be described in more detail hereinafter.

Connected to the output of the position information channel (1) of recorder 71 is a polarity separator 88 which separates in to positive and negative going waveform spikes 96, 98, the differentiated information and reference pulses of signal 95, derived from the recorded output pulses 68 of encoder 66. Spike pulse trains 96, 98 are then fed to trigger pairs 90 and 92, respectively. Trigger pair circuits 90, 92 provide pulses of constant amplitude for triggering a pulse reconstruction flip-flop circuit 94 to which trigger pairs 90, 92 are connected.

The purpose of reconstruction flip-flop 94 is to provide sharp and uniform square wave pulse signals with unvarying amplitude. A common problem in the recovery of square wave pulses from magnetic tape storage devices, is that the pulses, in differentiated form, vary in amplitude over a long time period and in fact often result in "pulse drop-out," a phenomenom in which one or more pulses completely disappear altogether from the tape. It will be appreciated that in order for the movable member to move smoothly and under exact control at all times, the pulse wave form 68 containing the information and reference wave forms must be completely reconstructed as an exact replica of the originally recorded wave form. By using trigger pairs 90, 92 instead of the differentiated pulses 96, 98 themselves to trigger reconstruction flip-flop 94, greater reconstruction accuracy is achieved.

An additional advantage resulting from the reconstruction of pulse train 68 by means of flip-flop circuit 94 lies in the fact that if pulses are lost during the recording process, they are lost in matched pairs. Thus, erratic operation resulting from responses by the system to spurious pulses is prevented. That is, if one of the pulses from the polarity separated trains 96 and 98 is lost, then the next succeeding pulse, which is of opposite polarity, will have no effect upon pulse reconstruction flip-flop 94. This will be readily apparent when the inherent operation of a bi-stable multivibrator such as an Eccles-Jordan flip-flop circuit, which may be used as a pulse reconstructor, is considered.

For example, if the flip-flop circuit 94 is flipped in one direction upon reception of a pulse from trigger pair 90, but the next succeeding pulse is missing from trigger pair 92, then the flip-flop circuit will stay flipped in the state set by the last received pulse 96. If the next succeeding pulse is a pulse from trigger pair 90, it will have no effect upon flip-flop circuit 94, as it has already been flipped in the direction represented by such a pulse. In effect, then, flip-flop circuit 94 acts as though the corresponding pulse from trigger pair 90 was also lost. It will not flip into another state until a pulse from trigger pair 92 is received.

The output of pulse reconstruction flip-flop 94 is connected to a differentiator, polarity separator and inverter unit 100. As the output signal 102 from pulse reconstruction flip-flop 94 is composed of square waves which are replicas of pulse train 68, the trailing edges of these square waves are converted into pulses by being differentiated, separated into positive and negative going spikes and then channelled into separate branches so that they may be properly utilized in ultimately guiding movable member 10 to repeat smoothly a desired program. Thus, the trailing edges of the square wave pulses comprising pulse train signal 102, are so processed by unit 100 and fed from dual outputs thereof into one of the inputs of each of flip-flops 84, 86. The output pulse spike wave forms of unit 100 are indicated generally by reference numerals 104, 106, with each pulse being identified as "I" and "R," respectively. The wave forms of these and the other pulses generated in the playback system are pictorially represented in FIG. 5.

Pulse train signal 106, which comprises a train of pulse spikes representative of the program reference pulses and designated as "R" pulses, is fed into the input of flip-flop A, designated by reference numeral 86, which has its input so connected that it is turned "on" by each of the reference pulses of signal 106. Pulse train signal 104, which comprises pulses representative of the originally programmed information pulses and designated as "I" pulses, is fed into the input of flip-flop B, designated by reference numeral 84, which is similar in construction and operation to flip-flop A. The input to flip-flop B is so connected that the pulses received thereby serve to turn that flip-flop "on." It will be noted that the pulse spikes comprising both pulse train signals 104, 106, have a repetition rate of approximately 250 cycles per second and are spaced from each other, 4 milliseconds in time.

The sine wave outputs of resolvers 18, 24 are again converted into square wave forms by squaring amplifiers 26 and 28. The trailing edges of the square wave output signals from amplifiers 26, 28 are amplified and inverted by units 38, 40, and differentiated by differentiators 80 and 82, respectively. The resulting output pulse spikes are generally shown as signals 108, 114, each pulse thereof being designated at $R_1$ and $I_1$, respectively. Signals 108, 114 are fed to inputs of flip-flops 84 and 86, which are connected in such a manner that $I_1$ pulses received from differentiator 80 turn off flip-flop B, whereas $R_1$ pulses received from differentiator and polarity separator 82 turn off flip-flop A.

The resulting output signal 110 from flip-flop A comprises a train of square wave known hereinafter as the "A" pulses, the leading edges thereof corresponding to reference pulses from pulse train 106 and the trailing edges thereof corresponding to reference pulses from pulse train 108, which can be said to have originated from adjustable resolver 24. Thus, the output of "A" flip-flop 86 is actually being controlled by the originally recorded reference signal pulses and by the reference signal generated by the adjustable reference resolver 24. In a like manner, the output signal of "B" flip-flop 84 is in the form of a square wave pulse train 112 and is known hereinafter as the B pulses. The leading edges of the "B" pulses correspond to the I information pulses of pulse signal 104, while the trailing edges correspond to the "new" $I_1$ information pulses 114, which may be said to have originated from the output of movable resolver 18.

It will be noted that both the $R_1$ and $I_1$ "off" turning pulses have a repetition rate of 500 cycles and thus have a spacing period only half as long as the "on" pulses supplied indirectly by the recorded program signal 95.

The derivation of an error signal by algebraically adding the "A" and "B" pulses (preferably subtracting the "A" from the "B" pulses), such a signal representing the difference between the desired and actual position of movable member 10 during playback of a program, will now be described with reference to FIG. 5.

As mentioned heretofore, during the playback operation, there is no frequency division of the square wave resolver output signal pulses, nor are gating units or a switch member 70 employed as in the program recording system. Yet, as differentiated pulses $R_1$, comprising pulse train 108 and pulses $I_1$, comprising pulse train 114 are derived from only the respective positive and negative going wave front portions of pulse trains 108, 114, these differentiated pulses have a two millisecond or one-half of a period spacing between successive pulses in each train.

By carefully adjusting the phase of the output sine wave from adjustable reference resolver 24 with respect to the sine wave input fed thereto from sine wave converter 78, the "on" time of each of the "A" pulse signals from flip-flop 86 is set at one millisecond or one-quarter of a period. That is, the phase between the R reference pulses derived from the recorded program forming pulse train 106, and reference pulses $R_1$, derived from reference resolver 24 during playback is, by means of resolver adjustment, set to one-quarter of a period. Then, whenever each "B" pulse of signal 112 is, when compared with an "A" pulse, equal to one-quarter of a period, the error between the actual and desired position of movable member 10 will be zero. In other words, E (error)=$B-A$. This is shown graphically in FIG. 5a.

Let $P_1$, (the desired position recorded on the tape)=the pulse length IR.

Let $P_2$ (the actual position of movable member 10 on playback)=$I_1 R_1$.

Then, by definition . . .

The Error=$P_1-P_2$.

However, as well be seen from FIG. 5a, by geometry . . .

$$B+P_2=A+P_1$$

then $$P_1-P_2=B-A$$

thence $$\text{Error}=B-A$$

A feature of the present invention is that, by means of the error derivation system just described, the error signal is relatively independent of slight phase shifts in the primaries of the resolvers 18, 24. Thus, if the sine wave being regenerated from the recorded signal should become slightly displaced in phase, the primaries and secondaries of the resolvers would see a similiar phase displacement. But, since signals derived from the secondary output signals of the resolvers turn off both the "A" and "B" pulses, any shift in phase will result in an equal change in length of both the "A" and "B" pulses. Upon subtraction of "A" from "B," an error signal results which is independent of the individual length of the "A" or "B" pulse.

Referring again to FIG. 2, the "A" and "B" pulse trains 110 and 112, respectively, are fed into an algebraic addition circuit 116 which subtracts the "A" pulses from the "B" pulses. The output pulses from adder circuit 116, resulting from the subtraction, are fed to a conventional integrating circuit 118 which provides an output in the form of a relatively stable D.C. voltage representative of the average error. This output voltage is fed to the input of a servo amplifier 120. The amplifier output voltage of servo amplifier 120 may be used to provide a control signal for a conventional servo mechanism 122, linked to movable member 10 in such a manner that it drives the member in a direction to diminish the positional error. Thus, it causes member 10 to follow the programmed information contained in the information storage media. Servo mechanism 122 may be an electrical, hydraulic, or mechanical servo valve mechanism as desired.

Referring again to the pulse diagrams of FIGS. 3 and 4, it will be observed that when the output signal 68 of encoder 66 has an "on" pulse length substantially equal to three-quarters of a period, the pulse length suddenly jumps back to one-quarter of a period in length. Conversely, if the pulse length as defined by point I and R, is diminishing towards the one-quarter of a period length, indicative of movement of member 10 in a given direction, the length of the on periods of pulses 68 will jump to three-quarters when the one-quarter period length has been reached. This, of course, is due to the action of switch 70 as described above. When these transition points are reached, heavy transient switching shocks occur during playback which cannot be smoothed completely by integrator circuits 118. Accordingly, to prevent the transmission of undesirable "bumps" or "jogs" to servo mechanism 122, anti-jog circuits 124, 126 are provided which perform additional smoothing and effectively remove the pulse length switching transients from the system. Anti-jog circuits 124, 126 will be described in detail in the course of the description of the circuit diagram of FIG. 6.

Figure 6:
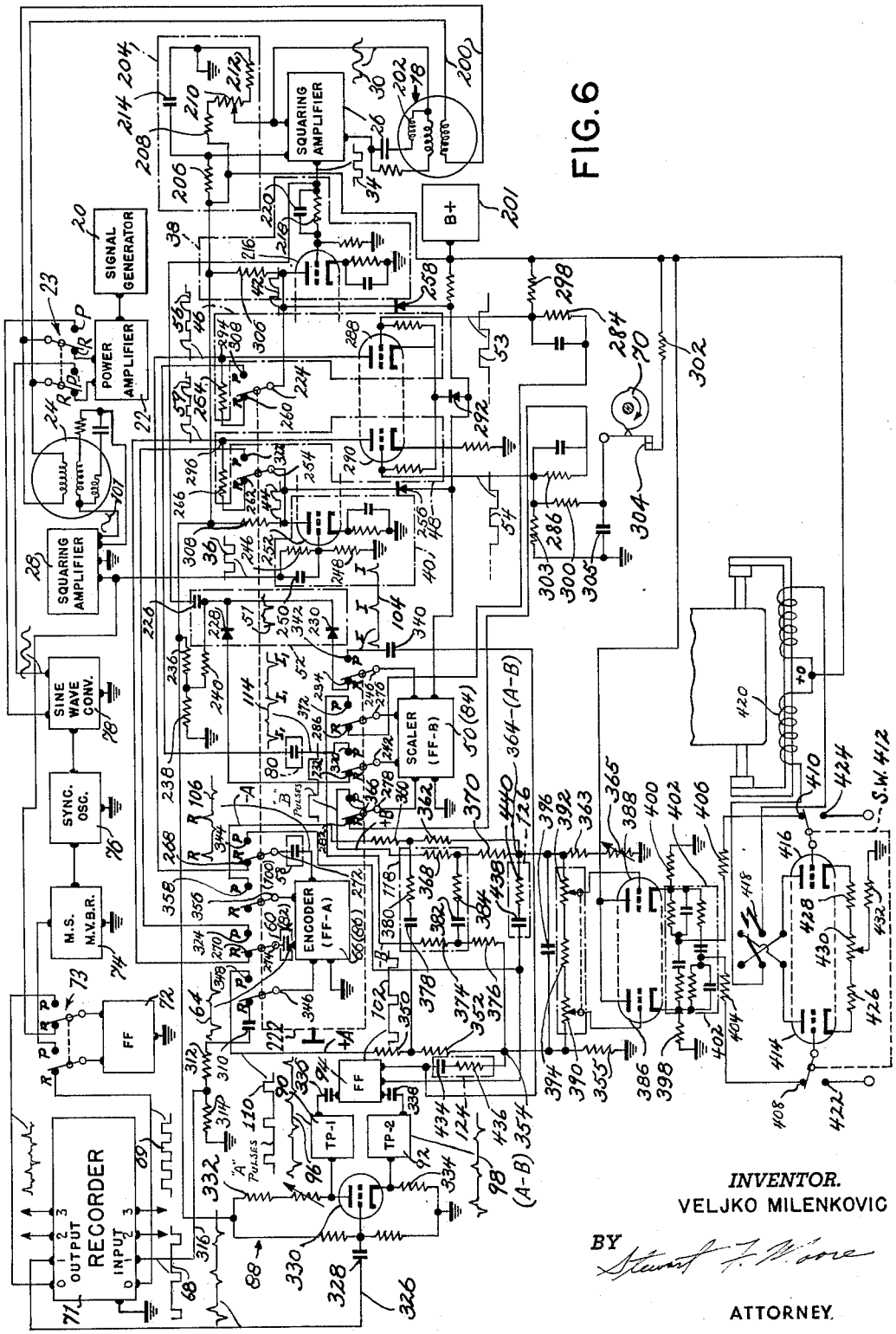
FIG. 6 is a schematic circuit diagram, partially in block form, of the position control system of the present invention.

Referring now to FIG. 6, there is shown a detailed schematic circuit diagram of the novel features of the record and playback units of the control system of the present invention. For purposes of simplifying the disclosure of the present invention, the circuit details of certain conventional units, such as the Schmitt trigger circuits comprising squaring amplifiers 26, 28, flip-flop circuits, sine wave oscillators, trigger pairs, are not shown in FIG. 6. As these circuit units are well known in the art, the details thereof are omitted from the drawings.

Signal generator 20, which may be any suitably stabilized sine wave oscillator capable of producing sine waves of good wave form at 500 cycles per second, has its output amplified by amplifier 22 and fed through "record," "playback" switch 23 to the input terminals 200 of resolver 18. The sine wave output of resolver 18, displaced in phase, with respect to the input signal appearing on terminals 200, in proportion to the degree of rotation of rotor 202, is fed to squaring amplifier 26 and to a voltage divider circuit 204. Voltage divider circuit 204 comprises resistors 206, 208, 210, 212, and a filter capacitor 214, connected in the manner shown between a source of positive voltage 201 and ground. Resistor 210 is adjustable. Voltage divider circuit 204 provides bias adjusting means to insure that the Schmitt trigger circuit, comprising squaring amplifier 26, operates at points of true zero cross-overs of the sine wave signal output of resolver 18.

The input electrode of electron tube 216 of inverter amplifier 38 is connected to the output of squaring amplifier 26 through a parallel connected resistor, capacitor combination 218, 220 respectively, which serve to compensate for the input capacitance of tube 216. The pulses of pulse signal 34 are therefore amplified and inverted by tube 216 and are fed to switch terminal 224 of gang switch 222, a double pole multi-throw switch shown in FIG. 6 in the "record" position.

Also connected to the output of power amplifier 22 is the primary of reference resolver 24. The sine wave output of resolver 24 is fed to the input of squaring amplifier 28, the output of which is connected, through a voltage dividing and compensating network, comprising resistors 246, 248 and capacitor 250, to the input electrode of electron tube 252 of amplifier inverter 40. Square wave pulse signal 36 is inverted by the operation of electron tube 252 and is fed from the output thereof to terminal 254 of gang switch 222.

Polarity separator and differentiator 52 comprising capacitance 226 and diodes 228, 230 are also connected to the output of squaring amplifier 26. By means of capacitance 226, functioning in conjunction with the output impedance of squaring amplifier 26, the square waves of pulse train 34 are differentiated to form the required spike-like pulses 51. Diodes 228 and 230 are connected to terminals 232, 234, respectively of gang switch 222 in such a manner that only the negative going spikes of wave form 51 are passed. Resistances 236 and 238 are connected in series between a source of suitable positive voltage and ground to provide, in conjunction with series resistor 240, a positive bias for diodes 228 and 230. Thus, only negative spikes of a magnitude sufficient to overcome the positive bias upon the diodes will be passed thereby.

When the wiper arms of gang switch 222 are in a record position, the negative going pulses 51 are transmitted to terminals 242, 246 of switch 222, to which are connected the input terminals of frequency divider 50 which may be a conventional bi-stable multi-vibrator, or flip-flop dividing circuit. Although it would appear that pulses of the same magnitude and polarity are being fed simultaneously to frequency divider 50 and therefore would apparently render it inoperative, yet it will be remembered that the sensitivity of conventional Eccles-Jordan flip-flop circuits is greater with respect to a source of input voltage which tends to change its state, than from a source which tends to maintain the circuit in its present state. Thus, frequency divider 50 will flip in the direction which allows it to flip from one state to another, even though identical pulses are received simultaneously at both inputs.

Connected between terminals 224 and 254 respectively, of switch 222 and a source of positive voltage 201, are diodes 256, 258 which provide a clamp level for the output pulse trains 42, 44 of amplifier inverter units 38 and 40 respectively. The diodes 256, 258 are connected with a polarity such that only positive going portions of pulse trains 42 and 44 are passed to switch wiper arms 224 and 254 respectively. Pulse trains 42 and 44 are thus fed through switch contacts 260 and 262 respectively, and through isolating resistors 264, 266 to record contacts 268, 270 of switch 222. When wiper arms 272 and 274 of switch 222 are in a record position so as to engage contacts 268 and 270 respectively, the pulse output of inverters 38 and 40 would be fed in an unchanged condition through differentiating capacitors 58 and 60 directly to encoder 66 were it not for the operation of gating circuits 46 and 48, which will now be described in detail.

The output pulses of frequency divider 50, which operate the gating circuits, are fed from output switch terminals 276, 278, connected to the movable arms of switch 222, and through contacts 286, 282 respectively, when switch 222 is in a record position, through resistors 284, 286 to the input electrodes of electron tubes 288 and 290 of gating circuits 46, 48 respectively. The cathodes of electron tubes 288 and 290 are clamped to the same pulse base voltage as terminal 224, by the action of diode 292 which is connected between the cathodes and the source of positive voltage 201. As the output electrodes of tubes 288 and 290 are respectively connected to isolating resistors 264 and 266, then when tubes 288 and 290 are conducting, terminals 294 and 296 are effectively placed, by the action thereof, at the clamp voltage. Thus, the outputs of amplifier inverters 38, 40 are electrically shorted when tubes 288 and 290 are in a conducting condition.

A source of positive biasing potential for the input electrode of tube 288 is provided by means of connections through resistor 298 to source of positive voltage 201. The magnitude of resistor 298 is adjusted so that the square wave pulses of pulse train 53, when operating in a positive direction, are of sufficient magnitude to cause tube 288 to conduct and thus cutoff the pulse output 42 from inverter 38 during the conducting periods. It will be remembered that the frequency of pulse train 53 is one-half that of pulse train 42. Thus, as shown in FIG. 3, every other pulse of pulse train 42 is inhibited or gated out, and assumes the form shown by the reference numeral 56.

Biasing potential for the input electrode of tube 290 is provided by means of resistors 300 and 302 connected in series to positive source 201. However, contacts 304 of cam operated switch 70 are serially connected between resistors 300, 302 so that the positive biasing potential is applied to the input electrode of valve 290 only when switch contacts 304 are closed. When these contacts are closed, the square wave pulses of pulse train signal 54 from frequency divider 50 operate in the same manner as the pulses from pulse train signal 53 to alternately render tube 290 conducting and non-conducting. Thus, pulse train signal 44 has every other pulse 44a inhibited during the positive pulse periods of pulse signal 54, provided switch contacts 304 are closed. In this case, the output wave form of gate 48 assumes that shown as pulse train 59 of FIG. 3. However, if switch contacts 304 are opened, the bias potential is removed from tube 290 and it is rendered non-conducting, regardless of the magnitude of the pulses of pulse train 54, so that the gate is ineffective or in an "open" condition. In this situation the pulse output of gate 48 is that shown by pulse signal 59a (FIG. 3).

As mentioned heretofore, the significant portions of the output pulses from amplifier inverters 38, 40 are the trailing edges of the pulses comprising pulse signals 42, 44, as these are the edges which are differentiated by differentiators 58 and 60 respectively. In order to insure that only the trailing edges of these pulses are fed to capacitor differentiators 58, 60, the positive going edges of the pulses of signals 42, 44 are deliberately rounded. This is accomplished by providing electron tubes 216 and 252 with anode resistors 306, 308 which are of a high magnitude, at least one megohm or more. These resistors, operating in conjunction with the distributed capacities of tubes 216, 252 serve to slow down the rise time of these pulses. By this action of rounding the leading edges of the pulses, polarity separation between the leading and trailing edges of the pulses forming signals 56 and 58, being fed to encoder 66 is achieved as only the steep trailing edges of the pulses are effectively differentiated by capacitors 58 and 60.

Since encoder 66 comprises a conventional flip-flop circuit, turned "on" by the differentiated pulses of wave train 62, which comprise the information pulses "I," and turned off by differentiated pulses 64 or 64a, which comprise the reference pulses "R," the output therefrom is in the form of square wave signal 68 which is fed through a capacitor 310 and voltage dividing resistors 312, 314 to output lead 316, which may be connected to any suitable recording device 71.

The channel "0" reference frequency, sync signal is generated as described in connection with FIG. 1, by units 20, 22, 24, 28 and flip-flop 72. The output of flip-flop is connected through "record," "playback" switch to input terminal "0" of recorder 71.

The circuit details of the playback circuit will now be described. It is the general function of the playback circuitry to translate the tape signal output provided by recoder 71, containing the encoded information and reference pulses, and the signals derived from the reference resolver 24 and movable resolver 18, into the A and B pulses as generally described above in connection with FIG. 2. The error due to the incorrect position of movable member 10, with respect to the desired position as expressed by the programmed signals on the tape, is represented by the difference between the A and B pulses. The error signal and its complement of opposite polarity are fed to a push-pull servo amplifier to the output of which is connected actuating coil of a hydraulic servo valve.

Referring again to FIG. 6, to initiate the program playback operation, ganged switch 222 is thrown to the playback position so that all of its actuating arms or wiping fingers engage contacts designated as P. In a like manner, switches 23 and 73 are also thrown to the playback position. During playback, the control signal for resolvers 18, 24 is derived from the square wave sync signal stored in channel "0" of recorder 71. As described above in connection with FIG. 2, this signal is translated into sine waves of the operating frequency of 500 cycles by means of flip-flop 72, monostable multivibrator 74, sync oscillator 76 and sine wave converter 78. These units are conventional elements, and are not shown in detail in FIG. 6.

The output signal 30 of resolver 18, which provides a signal representative of the actual position of movable member 10, is fed to squaring amplifier 26, amplified and inverted by amplifier 38 connected to squaring amplifier 26 and, through contacts 224 and 318 of switch 222, it is transmitted to differentiating capacitor 80. After being differentiated by capacitor 80, the output signal of channel B is in the form of the spiked pulses $I_1$ comprising wave form 114. These pulses are fed to one input of flip-flop B designated as 84, through contacts 320 and 242 of switch 222, and provide the "off" pulses for this unit, thereby defining the trailing edge of the B pulses.

In like manner, the output of reference resolver 24 is again fed to squaring amplifier 28 where the output signal is translated into square waves, and amplified by amplifier inverter 40. The output signal of amplifier 40 is transmitted to differentiating capacitor 82 through contacts 254 and 322, 324 and 274 of switch 222. After differentiating, the reference signal of channel A comprises the spiked pulses $R_1$ forming pulse train 108. These pulses are fed to one input of flip-flop A, designated as 86, and provide the "off" pulses for this unit, thereby defining the trailing edge of the A pulses.

The I and R or "on" pulses for flip-flops A and B are reconstructed on playback in the following manner:

The output of program channel (1) of tape recorder 71 is fed to a polarity separator 88 connected to input terminal 326 through capacitor 328. Polarity separator 88 may be a conventional triode 330 having equal anode and cathode resistors 332, 334 respectively, so that equal voltages of opposite polarity are developed thereacross. The pulse outputs of polarity separator 88 are fed to trigger pairs 90 and 92 respectively. The uniform pulse output signals of these units are in turn fed to the two inputs of reconstruction flip-flop circuit 94 through coupling capacitors 336 and 338.

Reconstruction flip-flop circuit 94, as is true of all flip-flop circuits, has two outputs, one of which is the inverse polarity of the other. One set of output signals from flip-flop circuit 94 is fed through a differentiating capacitor 340 and through terminal 342 and 244 of switch 222 to the other input of flip-flop B (84) which pulses, as will be remembered in connection with the description of FIG. 2, serve to form the I or "on" pulses 104 for this flip-flop unit, thereby defining the leading edge of the B pulses. Likewise, the other output of reconstruction flip-flop 94 supplies pulses of opposite polarity through contacts 344, 272 of switch 222, and differentiating capacitor 58 to the other input of flip-flop A (86). The differentiated pulse output of capacitor 58 comprises the R or "on" pulses 106 for unit 86, and thereby defines the leading edge of the A pulses. Differentiating capacitors 58 and 340, when considered in conjunction with the dual outputs of reconstruction flip-flop 94, serve to form the unit generally indicated in FIG. 2 as differentiator and polarity separator and inverter 100.

The algebraic addition of the A and B pulses, and the integration of the results of such addition to provide a servo valve operating signal will now be described.

One of the desirable features of the present invention is that the servo valve operating coils 420 are actuated by a balanced, push-pull type of circuit. Therefore, in order to implement this condition, both opposite polarity outputs of flip-flops 84 and 86 are utilized. Thus, output signals of a first polarity of A pulse wave form 110 are fed through contacts 346 and 348 of switch 222, and through series connected resistors 350 and 352 to junction point 354. This point is returned to ground through resistor 355. The line connecting contact 348 to resistor 350 is designated as the +A conductor. The A pulses of opposite polarity are fed through contacts 356 and 358 of switch 222, and through series connected resistors 360 and 362 to junction point 364. The feeder line thus formed is designated in the drawings as —A. Junction point 364 is returned to ground through fixed and variable resistors 363 and 365.

In a like manner, both outputs of flip-flop 84 are utilized to supply +B and —B pulses respectively, to junction points 354 and 364. Thus, a feed line designated as +B is established for feeding pulses of a first polarity comprising B pulse wave form 112 through contacts 278 and 366 of switch 222, and through series connected resistors 368 and 370 to junction point 364. A —B pulse feed line, so designated, is established by utilizing the second output of opposite polarity from flip-flop 84 to feed —B pulses through contacts 276 and 372 of switch 222 and through series connected resistors 374 and 376 to junction point 354. Accordingly, the +A and —B pulses are added at junction point 354, whereas the —A and +B pulses are added at junction point 364.

As no known servo valve can respond to individual pulses occurring at a frequency as high as 250 cycles per second, the results of the algebraic addition of the A and B pulses at junction points 354, 364 are integrated to provide a voltage representative of the average of a number of (A—B) and —(A—B) pulses. As the error increases or decreases, the average will vary likewise so that this analogue voltage may be amplified and utilized to operate an electromechanical servo valve.

Therefore, the two sets of A pulses of opposite polarity are partially integrated by means of serially connected capacitor 378 and resistor 380, connected between the junction points of resistors 350, 352 and 360, 362 respectively. Likewise, the B pulses are partially integrated by means of serially connected capacitors 382 and resistor 384, connected between junction points of resistors 374, 376 and 368, 370 respectively. Partial integration is performed in order not to deteriorate the response time of the system.

The partially integrated results of the algebraic addition performed at junction points 354 and 364 are applied to the input grids of dual triodes 386 and 388 through ganged potentiometers 390 and 392. These potentiometers have an end connected to each other through a resistor 394. Across the other ends of potentiometers 390, 392 is connected a capacitor 396. This capacitor-resistor network serves to perform complete integration of the A and B pulses by integrating the results of the algebraic addition of such pulses after the addition has been performed. Potentiometers 390 and 392 serve to adjust the gain of the servo system and are ganged so that the symmetry of the circuit is preserved.

The movable arms of the potentiometers are each connected to respective input grids of dual triode amplifiers 386 and 388, whereby the essentially D.C. signals resulting from the complete integration of the A and B pulses are fed thereto. These triodes are connected in a cathode follower type of circuit with resistors 398, 400, connected to cathodes thereof, serving as cathode output resistances.

A conventional Wein bridge network is also connected to the cathodes of triodes 386 and 388. It will be recognized that the Wein bridge generally indicated as 402 is a double Wein bridge network, one for each cathode circuit of the dual triodes. The property of the network is to modify the output signals of the cathode followers in such a way as to discriminate against frequencies which will tend to make the servo system unstable. In particular, such frequencies are obtained by actual tests and by calculating the resonant frequencies of the system with which the present invention is utilized. The Wein bridge elements comprise, in essence, notch filters which may be tuned to the natural frequency of the servo system so that such frequencies are suppressed, thereby preventing instability in the system.

The push-pull outputs of Wein bridge 402 are connected through isolating resistors 404 and 406 respectively, and contacts 408 and 410 respectively of switch 412 to the input grids of dual triodes 414 and 416 which serve to amplify the essentially D.C. error voltage applied to the inputs thereof. The anodes of triodes 414 and 416 are connected through a reversing switch 418 to a center tapped servo valve solenoid coil 420. It will thus be seen that the A and B pulses are algebraically added at junction 354, whereas the inverse or pulses of opposite polarity are algebraically added at junction 364, and the results of these additions are applied to opposed, balanced circuits in push-pull fashion. Therefore, when voltage at one junction increases, the voltage at the other is decreasing, with the net result that the servo valve is moved rapidly from a balanced to an unbalanced condition due to the push-pull action of these circuits.

Switch 412 may be thrown so as to engage contacts 422 and 424 and thus disconnect dual triodes 414 and 416 from the sensing and control circuits. A source of external voltage, such as a bridge circuit, may be connected to contacts 422 and 424 to provide independent, external control of servo valve solenoid 420. In this manner, movable member 10 may be controlled directly by means of such an externally applied voltage.

The cathodes of dual triodes 414 and 416 are connected in conventional fashion to ground through a pair of resistors 426, 428, potentiometer 430, and resistor 432 connected to the movable arm of potentiometer 430. Static balance of the servo amplifier may be achieved by adjusting potentiometer 430.

ANTI-JOG CIRCUIT

Referring again to FIG. 4, it will be noted that during the record cycle, as the angular position of switch shaft 16 progresses from zero towards 360 degrees indicating movement of movable member 10, there is a sharp transition point at the 360 degree position. The length of the "on" period of the encoder pulse output wave changes from the maximum of three-quarters to the minimum of one-quarter length at this point. This transition, of course, occurs at the position where switch 70 changes from an "on" to an "off" position, allowing all of the reference pulses 59a to pass through gate 48 (FIG. 1) during the recording cycle.

It will be remembered that during the switch "off" periods all of the reference pulses forming pulse train 59a are passed by gate 48 (FIG. 3). Also, due to the inherent operation of the switch in relation to the reference and information pulses at the transition point, the very next reference pulse is necessarily spaced one-quarter of a period from the last information pulse. Since this reference pulse is the one which turns "off" encoder flip-flop 66, the output wave form 68 of the encoder then suddenly jumps to a train of pulses having an "on" time of no greater than one-quarter of a period.

Before this transition occurs, wherein the reference pulse suddenly changes position by an amount equal to one-half period, all of the reference pulses are aproximately equally spaced. At the instant of transition, there is suddenly either a foreshortened or a lengthened time interval between reference pulses. The shortened interval would be reduced to one-half the normal spacing, whereas the lengthened interval would be equal to one and one-half time the normal spacing, depending on the direction in which movable member 10 is moving.

As the reference pulse during the playback cycle marks the beginning of an A pulse, the result of this transition in period length is that either an extra A pulse occurs at this point or an A pulse is missing. Since the signal ultimately fed to the servo valve amplifier 120 is substantially a D.C. voltage, the result of integrating the (A—B) pulses as explained above, the sudden loss of an A pulse or addition of an extra A pulse will cause a sharp change in the averaging function performed by the integrating circuits and manifest itself in the form of a transient pulse or sharp dip in the D.C. level of the signal fed to the servo amplifier 120. This, of course, will cause the servo valve, controlling movable member 10, to "pulse" or "jog" the member 10, or otherwise cause it to move in a "jerking" manner. This effect may be seen in FIG. 7, a moving pulse diagram.

In Line I, an arbitrary "on-off" time for gate switch 70 is illustrated. In Line II, the occurrence of reference pulses is indicated by solid lines, and those which are gated out are bracketed by dotted lines. Line III shows the occurrence of information pulses under conditions of movement of member 10. The gated out information pulses are also surrounded by dotted brackets. Line IV shows the resultant reconstruction flip-flop output wave form 102. It will be noted that its "on" time is gradually shortened from substantially three-quarters of a period in length to almost one-quarter of a period. At point IVa, it suddenly jumps again to a full three-quarter period.

Line V shows a train of B pulses, foreshortened in length, to illustrate the result thereon of error between information and actual position pulses I, $I_1$. The error is shown in dotted outline.

During high velocity movements of member 10, the B pulses will be spaced slightly greater in period, due to the "Doppler effect" of the moving machine resolver output, resulting in frequency modulation of the B pulses with fast movement. However, as such modulation has negligble effect on the operation of the system, it is not shown in FIG. 7. Line V then illustrates the spacing of B pulses during normal velocities of movable member 10.

Line VI illustrates a train of A pulses which, at point VIa, have their spacing therebetween suddenly increased to one-and-one-half times the normal interval. Line VII shows the D.C. signal resulting from the averaging of (A—B) but without "jog" compensation.

The slowly varying D.C. "average" signal, the servo error signal, is representative of the normal servo error due to the foreshortening and change in spacing of the B pulses as mentioned above. In the case of the frequency shift in B pulses, the resulting effect is a slight bias in error voltage which disappears when member 10 becomes stationary. However, in the case of the sudden shift in spacing of the A pulses, the result is a large and sudden decrease in the average signal output, as shown at point VIIa, due to the "jog" effect.

Referring again to FIG. 6, elimination of the "jogging" effect is provided by connecting capacitor 434 and resistor 436 in series with each other and in series with terminal 354 and one output terminal of reconstruction flip-flop 94. A like capacitor and resistor 438 and 440 are also connected in series and to terminal 364 and the other output terminal of reconstruction flip-flop 94. A like capacitor and resistor 438 and 440 are also connected in series and to terminal 364 and the other output terminal of reconstruction flip-flop 94.

The resistor-capacitor combination serve to differentiate the reconstruction flip-flop, pulse output wave train 102. The differentiating pulses are fed to each junction point 354, 364 with a differentiated pulse occurring in time correspondence with the leading and trailing edges of the pulses forming wave train 102. These differentiated pulses can be considered as a superposition onto the A and B pulses of differentiated, individual I and R pulses comprising the output signal of tape reconstruction flip-flop 94.

Referring again to FIG. 7, the relationships between the differentiated pulses of wave train 102 and the partially filtered A and B pulses are shown on Lines VIII, IX and X. Positive A pulses, after partial integration, are shown on Line VIII while positive B pulses, after partial integration, are shown on Line IX. To simplify the description, the integration of full B pulses, without error modification, are shown on Line IX, and following lines.

On Line VIII, the loss of D.C. level due to the missing A pulse, is indicated at point VIIIa. The partially integrated B pulses are shown in positive position, although in operation they are "substracted" from the A pulses by "adding" the corresponding negative or reversed phase B pulses thereto. The results of substracting the B from the A pulses, i.e., the algebraic addition of Line VIII to Line IX, is shown on Line X. The dip in D.C. levels is shown in this line at point Xa. The wave forms resulting from the differentiating of the pulses of wave train 102 are shown in line XI as pulses 444.

The differentiating elements of the circuits comprising anti-jog circuits 124, 126 are adjusted so that the total quantum of energy represented by the volt-time quantities of pulses 444, delivered by the circuits 124, 126 to junction points 354, 356, is equal in amount and opposite in polarity respectively, to the total quantum of energy comprising either an A or a B pulse. This is shown in Line XI, wherein pulses 444 are shown reduced in voltage amplitude by a factor of 2, to provide the proper compensating energy quantums. When this adjustment is made, the quantum of energy occurring at point XIa on Line XI would be equal to the amount of energy which would normally be contributed to points 354, 364 respectively, if an A pulse were present. Thus, the "negative going" dip in D.C. level at point Xa is effectively filled in by the excess positive energy area occurring at point XIa. The excess positive area at point XIa compensates for the deficiency in the (A—B) wave form, resulting in substantially uniform output over the A pulse transition point.

The excess negative excursion of wave form 446 at point XIIa is shown as being substantially reduced. The resultant output wave form resulting from the addition of Line X to Line XI is shown as pulse wave form 446 of Line XII. This pulse wave output is then integrated by potentiometers 390, 392, resistor 394 and capacitor 396, FIG. 6, as described above, to provide a "jog free," D.C. voltage for servo amplifier 120.

It will be understood that a similar set of pulse curves may be drawn for the algebraic addition of (A—B) occurring at junction point 364, where the opposite polarity of the anti-jog signal provided by anti-jog circuit 126 is applied. Of course, the output of junction 364 is integrated in the same manner as just described by the integrator components—potentiometers 390, 392, resistor 394 and capacitor 396.

It will also be understood that a transition occurs when movable member 10 is moving in the opposite direction from the example just described. This is a situation where the "on" time of the reconstruction flip-flop pulses 102 suddenly changes from a three-quarter to a one-quarter period, resulting in a temporary increase in the D.C. value of the (A—B) signal at point Xa. In this case, the anti-jog circuits 124, 126 produce an excess negative area at point XIa so that again the output remains uniform over the transition point.

The anti-jog circuits 124, 126 perform the same function as additional filters. Since the wave forms of pulse train 442 have quantums of energy equal to but opposite in polarity to those of the A and B pulses, the algebraic addition of these pulses thereto tends to counteract and suppress the basic fundamental harmonic of the (A—B) combination, i.e., the 250 cycle content thereof. The result tends to have only a higher harmonic frequency content as can be seen practically by inspection of curve XII of FIG. 7. Because the fundamental ripple frequency is suppressed by the anti-jog circuit action, the magnitude of the circuit components comprising the second filter need not be at great as would be needed without the harmonic suppression feature. Thus, the danger of excessive filtering, which would tend to slow down the response and degrade the performance of the servo system, is eliminated by the present invention.

In operation of the system just described, switches 23, 73 and 222 are first placed in the "record" position. Next, movable member 10 is manually guided through a desired series of movements along a selected path of travel to develop a program of selected operations. When the present invention is used with an automatic transfer machine such as disclosed in co-pending appln. S.N. 43,090, it is preferable to manipulate member 10 by means of an associated, manually controlled servo mechanism. As member 10 is guided through its program of movements, the instruction signal 68, representative of the history of these movements and the instantaneous position of member 10 is chronologically recorded by means of recorder 71.

To cause member 10 to repeat the desired program, it is only necessary to place switches 23, 73 and 222 into their playback positions. After the recording medium, preferably magnetic tape, is rewound or otherwise placed in a "playback" condition, the "playback" portion of the recorder is actuated and instruction signal 68 is read out from recorder 71 into the playback circuitry in the manner described above. It is accordingly translated into a first comparison signal, compared with a second comparison signal generated by the circuits associated with movable member 10 during playback, the two comparison signals algebraically added, and the results in the form of an error signal fed to servo mechanism 122, which causes movable member 10 to move until the error signal is nulled.

It will be appreciated that instruction signal 68 comprises a repetitive, two valued instruction signal having a predetermined cycling period, which two values may be "on and off" portions of signal 68, with the ratio of the time duration of the two values varying between predetermined limits in response to changes in the instantaneous relative position of the movable member.

Therefore the various signals controlling the recording and playback functions may be derived from a signal source oscillating at any suitable operating frequency. This is possible since the time ratio between the discrete values of the instruction signal will remain fixed regardless of the frequency at which they are generated. A major advantage of the present invention is that movable member 10 may be guided through its selected movements at a relatively slow velocity, but caused to repeat such movements during playback merely by increasing the playback speed of recorder 71. Thus, the program of movements may be speeded up or slowed down at will, without omitting any of the selected steps of a program.

RESOLVER SWITCH ELIMINATOR

For purposes of simplifying the description of the invention, the inhibition and pass areas set up about information pulses 62 were shown as being defined by operation of a mechanical switch 70 driven by shaft 16 on movable member 10, and having a pair of contacts which control the operability of gate 48 of channel A. However, as mechanical contacts are subject to wear and pitting, which may eventually result in unstable operation and consequently poor definition of the inhibit and pass areas, it is desirable to define these areas electronically. Thus, in accordance with a modification of the record section of the invention shown in FIG. 8, mechanical switch 70 is eliminated.

In order to simplify the drawings, the playback circuiting has been omitted, as it remains unchanged from the embodiment just described.

In particular, secondary winding 202 of resolver 18, which is driven by shaft 16 on movable member 10, is connected to squaring amplifier 26 of the Schmitt trigger type as before. The Schmitt trigger squaring amplifier 26 is connected to and operates flip-flop frequency divider circuit 50 as in the embodiment previously described so that the output signal 53 of scaler or frequency divider 50 has a frequency of one-half of the output of squaring amplifier 26.

The inverted output signal of squaring amplifier 26 comprising pulse train 34, is fed through an isolating resistor 500 to a voltage divider comprised of resistors 503 and 504. The output signal of frequency divider 50 is fed through a diode 506 to junction terminal 502. Because of the polarity of diode 506, whenever the output signal 53 of frequency divider 50 goes negative, diode 506 serves to clamp junction terminal 502 to ground and effectively clips every other pulse of signal 34. When frequency divider signal 53 is in the positive direction, diode 506 does not conduct, thus allowing free passage of any signal appearing on junction 502 to the grid of valve 508. As described previously in connection with FIG. 3, and the operation of gate B, wave form 56 is formed with every other pulse substantially eliminated by frequency divider 50. However, in this modification the leading edges of each positive pulse are not rounded, but remain square.

The circuitry associated with electron valve 508 is connected as a cathode follower, with an output signal being developed across resistor 510 which is connected between the cathode of valve 508 and ground. The purpose of the cathode follower arrangement is to furnish a low impedance signal source to the input of flip-flop encoder circuit 66, which is the same as described in connection with FIG. 6. The signal output developed across cathode resistor 510 is in the same phase as wave train 56 and is transmitted through isolating resistor 512, and serially connected diode 514 to the input of encoder 66. The polarity connections of diode 514 allow a positive going signal, developed across resistor 510 to turn on encoder 66. However, when the voltage across cathode resistor 510 begins to decrease in the negative direction, diode 514 is cut off and no longer passes a signal to encoder 66. The encoder then remains in the state as just previously established.

The output wave form 44, comprising pulses with rounded leading edges, derived from reference resolver 24 and squaring amplifier 28, connected as described heretofore, is amplified by valve 516 and passed through coupling capacitor 518 to junction terminal 520, to which diode 514 is connected. Coupling capacitor 528 differentiates the pulses appearing at the output of valve 516. It will be noted that there is no frequency division of the pulses forming wave form 44. Accordingly, the wave train appearing at junction 520, as passed by capacitor 518, has the form of wave form 64a, as shown in FIG. 3. These pulses then are the reference pulses and since they are negative going they will turn "off" flip-flop encoder circuit 66 which, it will be recalled, remains in an "on" state having once been turned "on" by the positive pulse from wave form 56.

It will be noted that wave form 56 is not differentiated as heretofore. Therefore, each positive portion is one quarter period in length. During this one quarter "on" period, the impedance at junction terminal 520, which is very low, is substantially the output impedance of the cathode follower circuit comprising valves 508 and 510. If negative pulses from pulse train 64a should appear during the positive "on" time at junction terminal 520, they will not be passed to encoder 66 as they originate from a high impedance source which includes capacitor 518, and the output impedance of electron valve 516. This high impedance source is effectively short circuited by the low impedance occurring at terminal 520, when diode 514 is in a conducting state. Thus, during the time that the encoder is receiving a positive pulse input from valve 508 which is always one quarter of a period in length, it cannot be turned off. However, it will be turned off by the first negative reference pulse occurring in time after the end of the positive "on" period.

Thus, when shaft 16 is moving, due to the shift in phase between reference and command pulses in response to such movement, a time occurs during which one of the reference pulses emerges just at the end of the holding period established by wave form 56. In this instance, the "on" time of the output signal 68 of encoder 66 will be very short. As the phase shift progresses, the encoder pulse will become increasingly longer until it reaches the three quarter period length. At this point, the next negative pulse of pulse train 64a is just emerging beyond the holding period. Accordingly, that pulse takes over command of the encoder and snaps it back into the quarter period situation just described. Thus, it will be seen that the desired conditions of a minimum duty cycle of a quarter of a period, and a maximum duty cycle of three quarters of a period for the encoder output signal 66, is fulfilled.

The situation occasionally arises where the relative position between the movable resolver and the reference resolver is such that the "turn off" pulse 64a just straddles the period where its passage through the electronic gate established by the "on" period of pulse wave form 56 is indeterminate. This may result in erratic operation of the encoder wherein it will be turned off for a few cycles, and then on, and thus, oscillating back and forth, would produce a few quarter period cycles followed by several three quarter period cycles.

To prevent this occurrence, a feedback system is provided wherein the encoder output is averaged, its D.C. level is detected, and the D.C. is fed back into the balance control of the movable resolver squaring amplifier 26. The D.C. level so derived is proportional to the "on period" of the encoder. Therefore, if the encoder output pulses are short, indicating that reference pulses have just cleared the holding period, then by feeding back the derived D.C. signal from the encoder 66 into the balance control, the squaring time, i.e., the time that squaring amplifier 26 begins to square the output signal pulses of resolver 18, will be slightly shortened. This will slightly decrease the gating or holding period, and thus insure that the reference pulses which turn off encoder 66, once they have occurred after the end of the holding period, will stay outside of this period.

On the other hand, once the first turn off pulse lies within the gating or "on" holding period, resulting in a longer encoder pulse output, the D.C. voltage associated with the integration of such longer pulses will be fed back into the input of squaring amplifier 26 and will thus make the squaring pulses slightly longer in length. In this manner, it serves to cause the encoder to maintain a three-quarter period once it has been initiated.

Referring to FIG. 8, the D.C. feedback voltage is derived as follows: A resistor 522 is connected to one output terminal of encoder 66 and to the junction terminal 524 of balance potentiometer 210, which serves to adjust the bias of the Schmitt trigger circuit of squaring amplifier 26. Capacitors 214 and 526 in conjunction with resistors 208, 210 and 212, provide an integrating or averaging action on the encoder signal output so that a D.C. bias voltage is derived therefrom and transmitted through the secondary of winding 202 of resolver 18 to the input of squaring amplifier 26. The D.C. voltage developed at junction 524 is in opposition to the normal bias voltage developed by voltage divider resistors 206, 208, 210 and 212. When the voltage appearing at junction 524 decreases, the sine wave output of resolver 18 must rise to a higher level before it is able to trip the Schmitt circuit of amplifier 26, and on the negative portion of the sine wave it will trip the Schmitt circuit sooner. This will result in a shorter duty cycle of squaring amplifier 26 whereas an increase in the voltage appearing at junction 524 will cause a longer duty cycle in the Schmitt circuit of squaring amplifier 26. Thus, by changing the D.C. bias at terminal 524, and by averaging the output of encoder 66, the positive "on" period of the pulses of wave form 56 is varied in such a manner as to increase the clearance time of the pulses, or for pulses which have not cleared, it will aid in making such pulses stay even longer within the gating period.

I claim:

1. Apparatus for controlling the position of a movable member comprising external means for driving said movable member through an arbitrary program of operation, means coupled to said movable member for generating a repetitive pulse signal having two discrete portions forming an instruction signal when said movable member is being driven by said external means, the ratio of the time duration of said portions varying between predetermined limits in response to changes in the instantaneous relative position of said movable member, recording means coupled to said instruction signal generating means for chronologically recording said instruction signal to form an instruction program for said movable member, motive means coupled to said recording means for driving said member in response to said recorded instruction program, means coupled to said movable member for generating a cyclically repetitive information signal representative of the instantaneous position of said movable member during playback of said recorded instruction program, means coupled to said recording means for deriving a cyclically repetitive reference signal from said instruction signal during playback, the ratio of the time spacing of said information and reference signals varying between predetermined limits in response to changes in instantaneous relative position of said movable member during playback, means coupled to said recording means and said reference signal deriving means and operative during playback for deriving a first comparison signal from said first portion of said recorded instruction signal and said reference signal, means coupled to said recording means and said information generating means and operative during playback for deriving a second comparison signal from said second portion of said instruction signal and said information signal, means coupled to said first and second comparison signal deriving means for algebraically adding said first and second comparison signals and generating an error signal representative of the results of said algebraic addition, and means coupled to said error signal generating means and said motive means and operative to effectively drive said motive means until said error signal is nullified.

2. Apparatus for controlling the position of a movable member comprising external means for driving said movable member through an arbitrary program of operation, means coupled to said movable member for generating a repetitive pulse signal having two discrete portions forming an instruction signal when said movable member is being driven by said external means, the ratio of the time duration of said portions varying between predetermined limits in response to changes in the instantaneous relative position of said movable member, recording means coupled to said instruction signal generating means for chronologically recording said instruction signal to form an instruction program for said movable member, motive means coupled to said recording means for driving said member in response to said recorded instruction program, means coupled to said movable member for generating a pair of pulses having a time spacing therebetween representative of a selected position of said movable member during playback, the time spacing between said pulses varying within predetermined maximum and minimum limits in response to change of position of said movable member during playback, means coupled to said recording means and operative during playback of said recorded instruction program for deriving a first comparison signal from said first portion of said recorded instruction signal and one of said playback pulses, means for deriving a second comparison signal from said second portion of said instruction signal and another of said playback pulses, means coupled to said first and second comparison signal deriving means for algebraically adding said first and second comparison signals, and generating an error signal representative of the results of said algebraic addition, and means coupled to said error signal generating means and said motive means and operative to effectively drive said motive means until said error signal is nullified.

3. Apparatus for controlling the position of a movable member comprising, external means for driving said movable member through an arbitrary program of operation, means coupled to said movable member for generating a repetitive instruction signal when said movable member is being driven by said external means, said instruction signal having a predetermined cycling period and having $m$ and $n$ portions of diverse values, the ratio of the time duration of said $m$ and $n$ portions varying between predetermined limits in response to changes in the instantaneous relative position of said movable member, recording means coupled to said instruction signal generating means for chronologically recording said instruction signal to form an instruction program for said movable member, motive means coupled to said recording means for driving said member in response to said recorded instruction program, means coupled to said movable member for generating a cyclically repetitive information signal representative of the instantaneous position of said movable member during playback of said recorded instruction program, said information signal having $m_1$ and $n_1$ portions of diverse values, the ratio of the time duration of said $m_1$ and $n_1$ portions varying between predetermined limits in response to changes in the instantaneous relative position of said movable member during playback, first comparison signal forming means coupled to said recording means and to said information signal generating means and activated upon the commencement of said $m$ portion of said instruction signal and deactivated upon the commencement of said $m_1$ portion of said information signal to form a first comparison signal having a time duration representative of the elapsed time between said activation and deactivation of said first comparison signal forming means, second comparison signal forming means coupled to said recording means and said information signal generating means and activated upon the commencement of said $n$ portion of said instruction signal and deactivated upon the commencement of said $n_1$ portion of said information signal to form a second comparison signal having a time duration representative of the elapsed time between said activation and deactivation of said second comparison signal forming means, means coupled to said first and second comparison signal deriving means for algebraically adding said first and second comparison signal and generating an error signal representative of the results of said algebraic addition, and said motive means and operative to effectively drive and means coupled to said error signal generating means said motive means until said error signal is nullified.

4. The invention defined in claim 3 including means for selectively adjusting the time spacing of the commencement of said $m$ and $m_1$ portions of said instruction and information signals respectively, so that said first comparison signal serves as a reference standard for said second comparison signal.

5. In a control system of the type having recording means for chronologically recording an instruction program for controlling the position of a movable member, said program comprising a repetitive pulse signal having two discrete portions forming an instruction signal, the ratio of the time duration of said portions varying between predetermined limits in response to changes in the instantaneous relative position of a movable member whose position is to be controlled, playback control apparatus for said movable member comprising means coupled to said recording means for differentiating and polarity separating the commencement of each portion of said instruction signal into a first and second plurality of discrete pulses of opposite polarity designated as I and R pulses respectively, means coupled to said recording means for generating a third plurality of discrete pulses designated as $R_1$ pulses, means coupled to said movable member and operative to generate a fourth plurality of pulses designated as $I_1$ pulses, means coupled to said recording means and said movable member and operative to shift the phase of said $I_1$ pulses with respect to said $R_1$ pulses in response to movement of said movable member during playback of said recorded program, first comparison signal generating means connected to said polarity separating means and said $R_1$ pulse generating means and actuated in response to reception of each R pulse and deactivated in response to each $R_1$ pulse to generate a first comparison signal having a time duration representative of the elapsed time between said activation and deactivation of said first comparison signal generating means, second comparison signal generating means connected to said polarity separating means and said $I_1$ pulse generating means and actuated in response to reception of each I pulse and deactivated in response to reception of each $I_1$ pulse to generate a second signal having a time duration representative of the elapsed time between said activation and deactivation of said first comparison signal generating means, and means coupled to said first and second comparison signal generating means for algebraically adding said first and second comparison signals to generate an error signal representative of the results of said algebraic addition.

6. In a control system of the type having recording means for chronologically recording an instruction program for controlling the position of a movable member, said program comprising a repetitive pulse signal having two discrete portions forming an instruction signal, the ratio of the time duration of said portion varying between predetermined limits in response to changes in the instantaneous relative position of a movable member whose position is to be controlled, playback error signal generating apparatus for said movable member comprising an instruction signal channel coupled to said recording means for transmitting said recorded instruction signal, a reference channel and an information channel having inputs and outputs, means coupled to said recording means and to the input of each of said reference and information channels for deriving a common signal of selected frequency from said instruction signal and transmitting said common signal to said reference and information channels, means operative to shift the phase of the portion of said common signal passing through said information channel with respect to the portion passing through said reference channel in response to a change of position of said movable member, means connected to the output of said reference channel and said instruction signal channel and operative in response to reception of said signal from said reference channel and the commencement of the first portion of said recorded, instruction signal to generate a first comparison signal representative of the elapsed time between the commencement of said first portion of said instruction signal and said reference channel signal, means connected to the output of said information channel and said instruction channel and operative in response to reception of said signal from said information channel and the commencement of the second portion of said instruction signal to generate a second comparison signal representative of the elapsed time between the commencement of said second portion of said instruction signal and said information channel signal, and means for algebraically adding said first and second comparison signals to generate an error signal representative of the results of said algebraic addition.

7. The invention defined in claim 6 wherein the ratio of the time duration of said portions of said instruction signal varying between predetermined limits is shifted to an unexceeded limit whenever one of said limits is exceeded, and including means connected to said error signal generating means and operative in response to the shifting during playback of said time ratio of said instruction signal for preventing said motive means from disruptively driving said movable member when said shift occurs.

8. Apparatus for controlling the position of a movable member comprising, external means for driving said movable member through an arbitrary program of operation, means coupled to said movable member for generating a pair of pulses having a time spacing therebetween representative of the selected position of said movable member when said movable member is driven by said external means, means operative to vary the time spacing between said pulses within predetermined maximum and minimum limits in response to a change of position of said movable member, means coupled to said pulse space varying means and effective whenever one of said limits is exceeded to shift said spacing from the exceeded to the unexceeded limit, means coupled to said pulse space carrying means for deriving an instruction signal having a characteristic varying in response to said variations in time spacing between said pulses, recording means coupled to said instruction signal deriving means for chronologically recording said instruction signal to form an instruction program for said movable member, motive means coupled to said recording means for driving said member in response to said recorded instruction program, means coupled to said movable member for generating a pair of pulses having a time spacing therebetween representative of a selected position of said movable member during playback, the time spacing between said pulses varying within predetermined maximum and minimum limits in response to a change of position of said movable member during playback, means coupled to said recording means and operative during playback of said recorded instruction program for deriving a first comparison signal from a first selected variation of said characteristic of said recorded instruction signal and one of said playback pulses, means coupled to said first and second comparison signal deriving means for algebraically adding said first and second comparison signals and generating an error signal representative of the results of said algebraic addition, and means coupled to said error signal generating means and said motive means until said error signal is nullified.

9. The invention defined in claim 8 including means connected to said error signal generating means for supplying a quantum of signal energy thereto each time the characteristic of said recorded instruction signal varies in response to the sudden shifting in spacing of said first named pulses when one of said limits is exceeded, thereby causing said error signal to suddenly change in level at the transition point of said shift, said quantum of energy being substantially equal in magnitude and opposite in polarity ot said variation in level of said error signal, whereby disturbances occurring at said shift transition points during the driving of said movable member by said motive means, are prevented.

10. The invention defined in claim 8 including means for partially integrating said error signal, means connected to said partial integrating means for preventing disturbances from occurring during the driving of said movable member by motive means when said spacing between said instruction signal pulses is shifted from the exceeded to the unexceeded limits, and means for fully intergrating said disturbance corrected error signal.

11. The invention defined in claim 8 including means connected to said error generating means for suppressing frequency components of said error signal representative of the resonant frequency of the apparatus being controlled.

12. The invention defined in claim 11 wherein said resonant frequency supressing means is a Wein bridge tuned to the natural frequency of the apparatus being controlled.

13. The invention defined in claim 8 wherein said motive means for driving said movable member in response to said recorded instruction program includes a hydraulic servo system of the type having a solenoid actuated servo valve for selectively actuating said servo system in response to an error signal, said solenoid having a pair of actuating coils, and including means for translating said error signal into complementary driving signals of opposite polarity, and means for transmitting each of said driving signals to one of solenoid coils to actuate said servo valve in push-pull fashion whenever said error signal occurs.

14. In a pulse time ratio, movable member position control system, wherein the instruction pulse signal has a predetermined cycling period, and the ratio of the time duration of one of the characteristics of said pulse signal varies between predetermined limits in response to changes in the relative position of the movable member and wherein said ratio is shifted from the exceeded to the unexceeded limit whenever one of said limits is exceeded, means for preventing said member being controlled from receiving disruptions in the movement thereof when said shifts occur, comprising means for deriving a quantum of energy representative of the quantum of pulse signal energy altered by said pulse length shifting, and means coupled to said energy deriving means for injecting said derived quantum in said control system at a selected point whenever said shifts occur, said quantum of energy having a selected polarity operable to counteract and nullify said disruptions in the movement of said member.

15. Playback apparatus for moving a member through a desired program including a first means receiving a recorded instruction signal having a first characteristic representative of the selected positions of said member, said characteristic varying within predetermined maximum and minimum limits and shifting from one end of the range between said limits to the other end of the range as either limit tends to be exceeded, and a second means responsive to said characteristic within said limits for moving the member over a portion of its total travel, said second means being arranged to maintain the movement of said member without change of direction when said characteristic shifts at each of said limits, whereby the range of programmed movement of said member is greater than that represented by the interval between said limits.

16. Apparatus according to claim 15 wherein said first mentioned characteristic has an intermediate value between said maximum and minimum limits when said member is at the beginning of said portion of its total travel, increases to said maximum limit when said member is at an intermediate position in said portion, and abruptly shifts to said minimum limit when said member moves slightly past said intermediate position.

17. Apparatus according to claim 15 including motive means for driving said member in response to said recorded instruction program, and wherein said second means includes means for generating a cyclically repetitive information signal, means for generating a cyclically repetitive reference signal, means for deriving a first comparison signal from a first selected portion of said recorded instruction signal and said reference signal, means for deriving a second comparison signal from a selected portion of said instruction signal and said information signal, means for algebraically adding said first and second comparison signals, and means for generating an error signal representative of the results of said algebraic addition, said error signal means effectively driving said motive means until said error signal is nullified.

18. Apparatus according to claim 15 wherein said recorded signal is a double valued signal having a second characteristic representative of the length of said portion of the total travel of said member and said second means is responsive to the ratio of said two characteristics.

19. Apparatus according to claim 18 wherein said first mentioned characteristic has a minimum value greater than zero and a maximum value less than said second characteristic.

References Cited by the Examiner

UNITED STATES PATENTS

| | | | |
|---|---|---|---|
| 2,512,680 | 6/1950 | Roberts | 340—345 |
| 2,755,422 | 7/1956 | Livingston | 318—162 |
| 2,882,475 | 4/1959 | DeNeergard | 318—162 |
| 2,932,016 | 4/1960 | Dayonnet et al. | 340—345 |
| 2,937,365 | 5/1960 | Peaslee | 318—39 X |
| 2,943,251 | 6/1960 | Hull | 318—162 |
| 3,119,054 | 1/1964 | Livingston | 318—30 X |

ORIS L. RADER, *Primary Examiner.*